US010624106B2

(12) United States Patent
Park et al.

(10) Patent No.: US 10,624,106 B2
(45) Date of Patent: *Apr. 14, 2020

(54) METHOD FOR TRANSMITTING UPLINK FRAMES OF MULTIPLE USERS IN A WIRELESS LAN SYSTEM

(71) Applicant: LG ELECTRONICS INC., Seoul (KR)

(72) Inventors: Hyunhee Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/771,901

(22) PCT Filed: Oct. 27, 2016

(86) PCT No.: PCT/KR2016/012184
§ 371 (c)(1),
(2) Date: Apr. 27, 2018

(87) PCT Pub. No.: WO2017/074070
PCT Pub. Date: May 4, 2017

(65) Prior Publication Data
US 2018/0317242 A1 Nov. 1, 2018

Related U.S. Application Data

(60) Provisional application No. 62/246,641, filed on Oct. 27, 2015, provisional application No. 62/246,643, (Continued)

(51) Int. Cl.
H04W 72/12 (2009.01)
H04W 74/08 (2009.01)
H04W 84/12 (2009.01)

(52) U.S. Cl.
CPC ..... H04W 72/121 (2013.01); H04W 72/1268 (2013.01); H04W 74/085 (2013.01);
(Continued)

(58) Field of Classification Search
CPC .................................................. H04W 84/12
See application file for complete search history.

(56) References Cited

U.S. PATENT DOCUMENTS

2016/0315675 A1* 10/2016 Seok .................... H04B 7/0452

FOREIGN PATENT DOCUMENTS

KR 1020150087837 7/2015
WO 2013157787 10/2013
(Continued)

OTHER PUBLICATIONS

PCT International Application No. PCT/KR2016/012184, International Search Report dated Jan. 12, 2017, 6 pages.

Primary Examiner — Kent Krueger
(74) Attorney, Agent, or Firm — Lee Hong Degerman Kang Waimey

(57) ABSTRACT

A method for transmitting uplink frames of multiple users in a wireless LAN system according to an embodiment of the present invention comprises the steps of: an STA performing a countdown operation of a backoff counter for a contention-based channel access; the STA receiving a trigger frame which individually allocates uplink radio resources for the multiple users; the STA suspending the countdown operation until the uplink transmission of the trigger-based frame is terminated, wherein the trigger-based frame is a frame transmitted through an overlapped time interval in response (Continued)

to the trigger frame; determining whether the STA receives an acknowledgment (ACK) frame corresponding to the trigger-based frame from an AP; and if the STA fails to receive the ACK frame from the AP, the STA resuming a suspended countdown operation.

12 Claims, 27 Drawing Sheets

Related U.S. Application Data filed on Oct. 27, 2015, provisional application No. 62/331,443, filed on May 4, 2016.

(52) U.S. Cl.
CPC .... *H04W 74/0816* (2013.01); *H04W 72/1289* (2013.01); *H04W 84/12* (2013.01)

(56) References Cited

FOREIGN PATENT DOCUMENTS

| | | |
|---|---|---|
| WO | 2013191470 | 12/2013 |
| WO | 2014042595 | 3/2014 |
| WO | 2015112780 | 7/2015 |

\* cited by examiner

FIG. 1
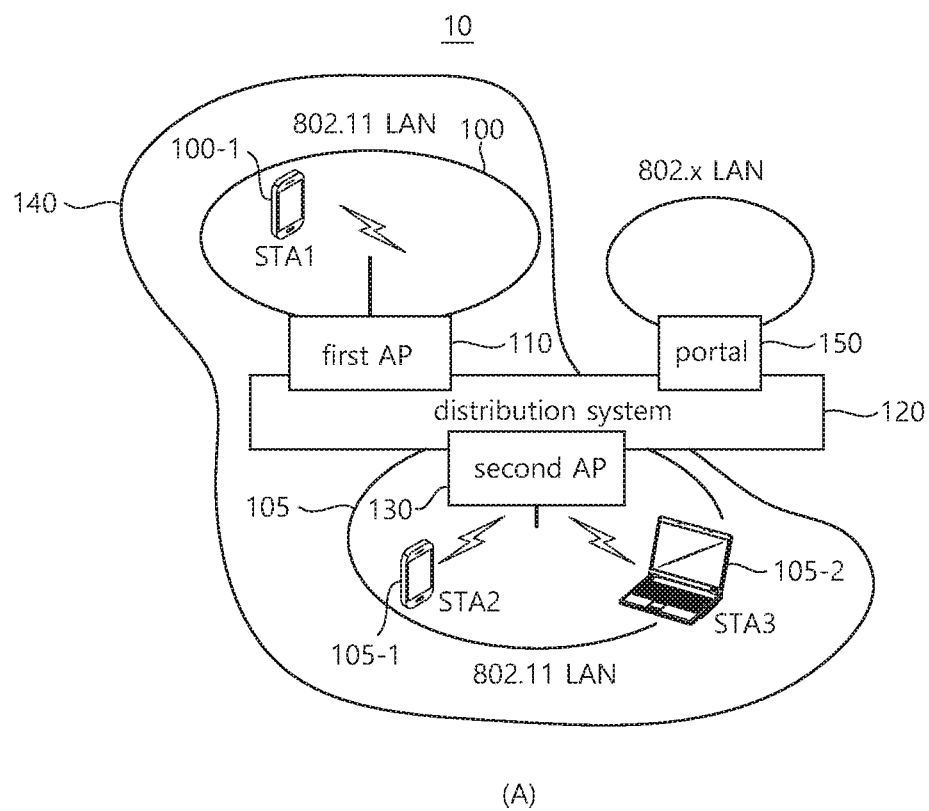
(A)
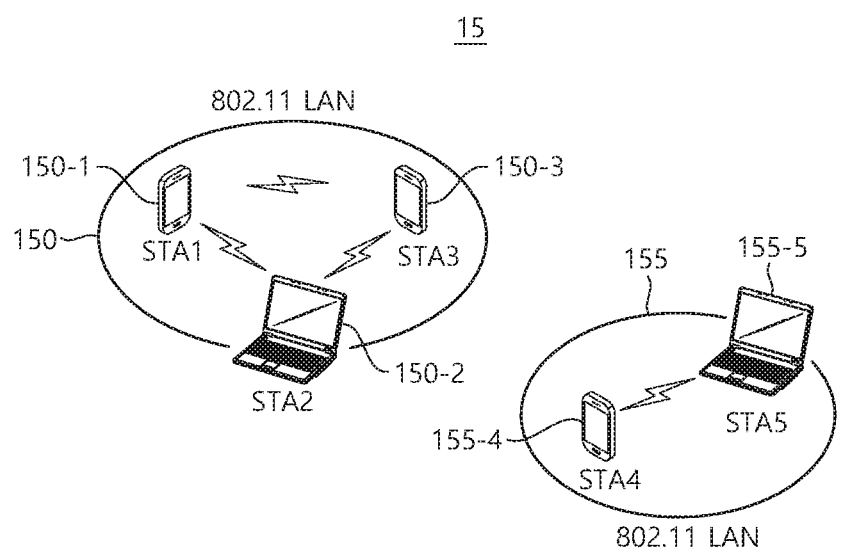
(B)

METHOD FOR TRANSMITTING UPLINK FRAMES OF MULTIPLE USERS IN A WIRELESS LAN SYSTEM

CROSS-REFERENCE TO RELATED APPLICATIONS

This application is the National Stage filing under 35 U.S.C. 371 of International Application No. PCT/KR2016/012184, filed on Oct. 27, 2016, which claims the benefit of U.S. Provisional Application Nos. 62/246,641, filed on Oct. 27, 2015, 62/246,643, filed on Oct. 27, 2015, and 62/331,443, filed on May 4, 2016, the contents of which are all hereby incorporated by reference herein in their entirety.

BACKGROUND OF THE INVENTION

Field of the Invention

The present invention relates to a method for transmitting and/or receiving data in wireless communication and, most particularly, to a method and device for transmitting uplink frames of multiple users in a wireless LAN system.

Related Art

A next-generation WLAN is aimed at 1) improving Institute of Electrical and Electronics Engineers (IEEE) 802.11 physical (PHY) and medium access control (MAC) layers in bands of 2.4 GHz and 5 GHz, 2) increasing spectrum efficiency and area throughput, and 3) improving performance in actual indoor and outdoor environments, such as an environment in which an interference source exists, a dense heterogeneous network environment, and an environment in which a high user load exists.

In the next-generation WLAN, a dense environment having a great number of access points (APs) and stations (STAs) is primarily considered. Discussions have been conducted on improvement in spectrum efficiency and area throughput in this dense environment. The next-generation WLAN pays attention to actual performance improvement not only in an indoor environment but also in an outdoor environment, which is not significantly considered in the existing WLAN.

Specifically, scenarios for a wireless office, a smart home, a stadium, a hotspot, and the like receive attention in the next-generation WLAN. Discussions are ongoing on improvement in the performance of a WLAN system in the dense environment including a large number of APs and STAs based on relevant scenarios.

In the next-generation WLAN, improvement of system performance in an overlapping basic service set (OBSS) environment and improvement of outdoor environment performance, and cellular offloading are expected to be more actively discussed rather than the improvement of single link performance in one basic service set (BSS). Directionality of the next-generation means that the next-generation WLAN is gradually achieving a technical scope that is similar to that of mobile communication. Considering the recent situation wherein discussions have been made on the mobile communication and WLAN technology in areas of small cells and direct-to-direct (D2D) communication area, technical and business convergence of the next-generation WLAN and the mobile communication is predicted to be more active in the future.

SUMMARY OF THE INVENTION

Technical Objects

An object of this specification is to provide a method and device for transmitting uplink frames of multiple users in a wireless LAN system with more enhanced performance.

Technical Solutions

This specification relates to a method and device for transmitting uplink frames of multiple users in a wireless local area network (WLAN) system. The method for transmitting uplink frames of multiple users according to an exemplary embodiment of this specification may include the steps of performing, by a station (STA), a countdown operation of a backoff counter for a contention-based channel access, receiving, by the STA, a trigger frame individually allocating uplink radio resources for the multi user, suspending, by the STA, the countdown operation until a completion of an uplink transmission of a trigger-based frame, wherein the trigger-based frame corresponds to a frame being transmitted through an overlapping time section as a response to the trigger frame, determining, by the STA, whether or not an acknowledgement (ACK) frame for the trigger-based frame is received from an access point (AP), and, if the STA fails to receive the ACK frame from the AP, resuming, by the STA, the suspended countdown operation.

Effects of the Invention

According to an exemplary embodiment of this specification, provided herein is a method and device requesting uplink data in a wireless LAN system with more enhanced performance.

BRIEF DESCRIPTION OF THE DRAWINGS

FIG. 1 is a conceptual view illustrating the structure of a wireless local area network.

DESCRIPTION OF EXEMPLARY EMBODIMENTS

Figure 2:
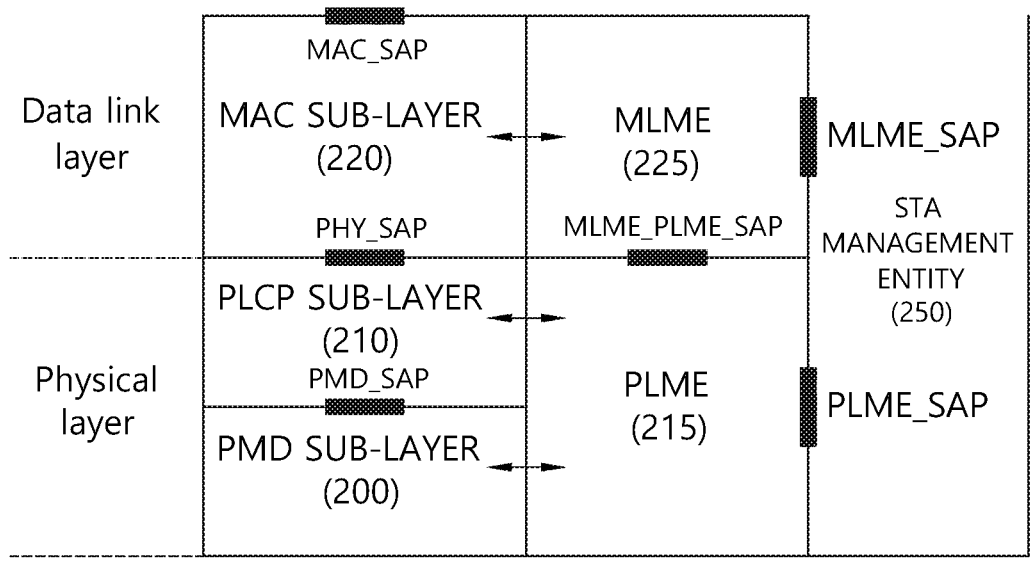
FIG. 2 is a conceptual view illustrating a layered architecture of a WLAN system supported by IEEE 802.11.

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only and is not intended to limit the concept of the present specification. Further, embodiments described to help understanding of the invention also includes complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

FIG. 1 is a conceptual view illustrating the structure of a wireless local area network (WLAN). FIG. 1 (A) illustrates the structure of an infrastructure basic service set (BSS) of institute of electrical and electronic engineers (IEEE) 802.11.

Referring the FIG. 1 (A), the wireless LAN system 10 of the FIG. 1 (A) may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, The BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1 (A), a network between the APs 110 and 130 and a network between the APs 110 and 130 and the STAs 100-1, 105-1, and 105-2 may be implemented.

FIG. 1 (B) illustrates a conceptual view illustrating the IBSS.

Referring to FIG. 1(B), a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1 (B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner. In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 is a conceptual view illustrating a layered architecture of a WLAN system supported by IEEE 802.11. Referring to FIG. 2, the layered architecture of the WLAN system may include a physical medium dependent (PMD) sub-layer 200, a physical layer convergence procedure (PLCP) sub-layer 210, and a medium access control (MAC) sub-layer 220.

The PLCP sub-layer 200 may serve as a transmission interface for transmitting/receiving data between a plurality of STAs. The PLCP sub-layer 210 is implemented such that the MAC sub-layer 220 is operated with a minimum dependency with respect to the PMD sub-layer 200.

The PMD sub-layer 200, the PLCP sub-layer 210, and the MAC sub-layer 220 may conceptually include respective management entities. For example, the management entity of the MAC sub-layer 220 is referred to as a MAC layer management entity (MLME) 225. The management entity of the physical layer is referred to as a PHY layer management entity (PLME) 215.

The management entities may provide an interface for performing a layer management operation. For example, the PLME 215 may be connected to the MLME 225 to perform a management operation of the PLCP sub-layer 210 and the PMD sub-layer 200. The MLME 225 may be connected to the PLME 215 to perform a management operation of the MAC sub-layer 220.

An STA management entity (SME) 250 may exist to perform a proper MAC layer operation. The SME 250 may be operated as a constitutional element independent of each layer. The PLME 215, the MLME 225, and the SME 250 may mutually transmit and receive information on the basis of a primitive.

The operation of each sub-layer is briefly described as follows. For example, the PLCP sub-layer 210 delivers a MAC protocol data unit (MPDU) received from the MAC sub-layer 220 according to an instruction of the MAC layer between the MAC sub-layer 220 and the PMD sub-layer 200 to the PMD sub-layer 200 or delivers a frame from the PMD sub-layer 200 to the MAC sub-layer 220.

The PMD sub-layer 200 is a PLCP sub-layer and may transmit and receive data between a plurality of STAs through a wireless medium. The MPDU delivered from the MAC sub-layer 220 is referred to as a physical service data unit (PSDU) in the PLCP sub-layer 210. Although the MPDU is similar to the PSDU, if an aggregated MPDU (AMPDU) obtained by aggregating a plurality of MPDUs is delivered, the MPDUs may be individually different from the PSDUs.

The PLCP sub-layer 210 adds an additional field including information required by a transceiver of a physical layer in a process of receiving the PSDU from the MAC sub-layer 220 and delivering it to the PMD sub-layer 200. In this case, the field added to the PSDU may be a PLCP preamble, a PLCP header, and tail bits required to return a convolution encoder to a zero state.

The PLCP sub-layer 210 adds the aforementioned fields to the PSDU to generate a PLCP protocol data unit (PPDU) and transmits the PPDU to a receiving station through the PMD sub-layer 200. The receiving station receives the PPDU to perform restoration by obtaining information required to restore data from the PLCP preamble and the PLCP header.

Figure 3:
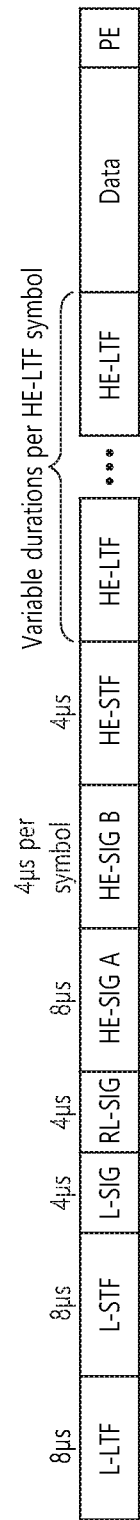
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted during an illustrated time period (that is, 4 or 8 μs).

More detailed description of the respective fields of FIG. 3 will be made below.

Figure 4:
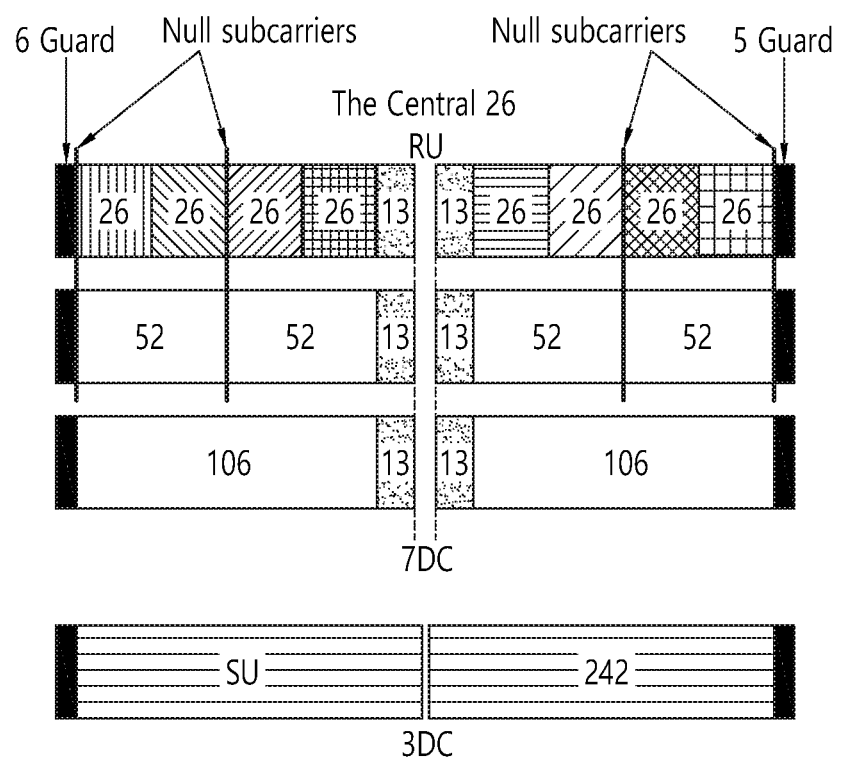
FIG. 4 is a diagram illustrating a layout of resource units used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
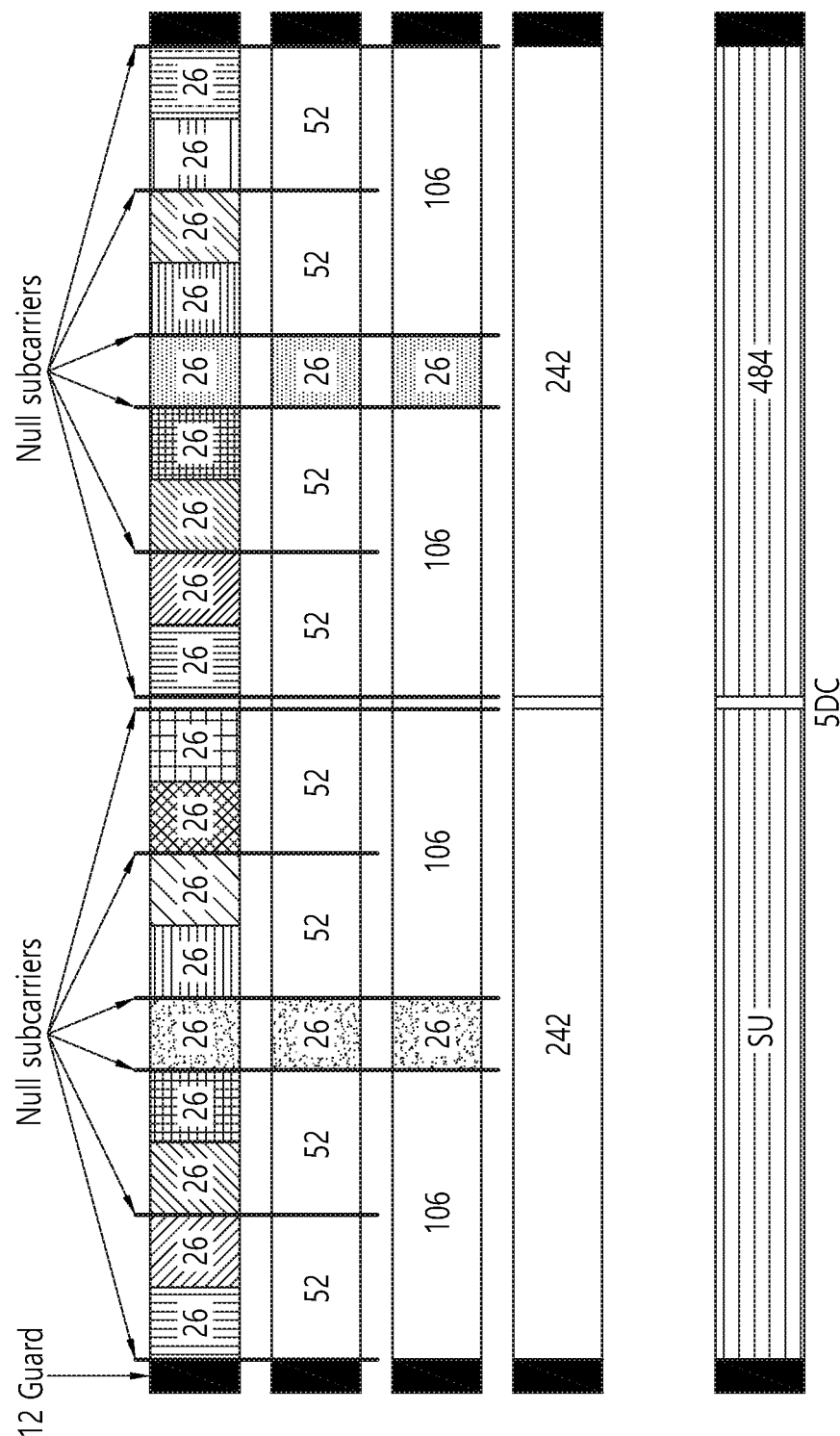
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
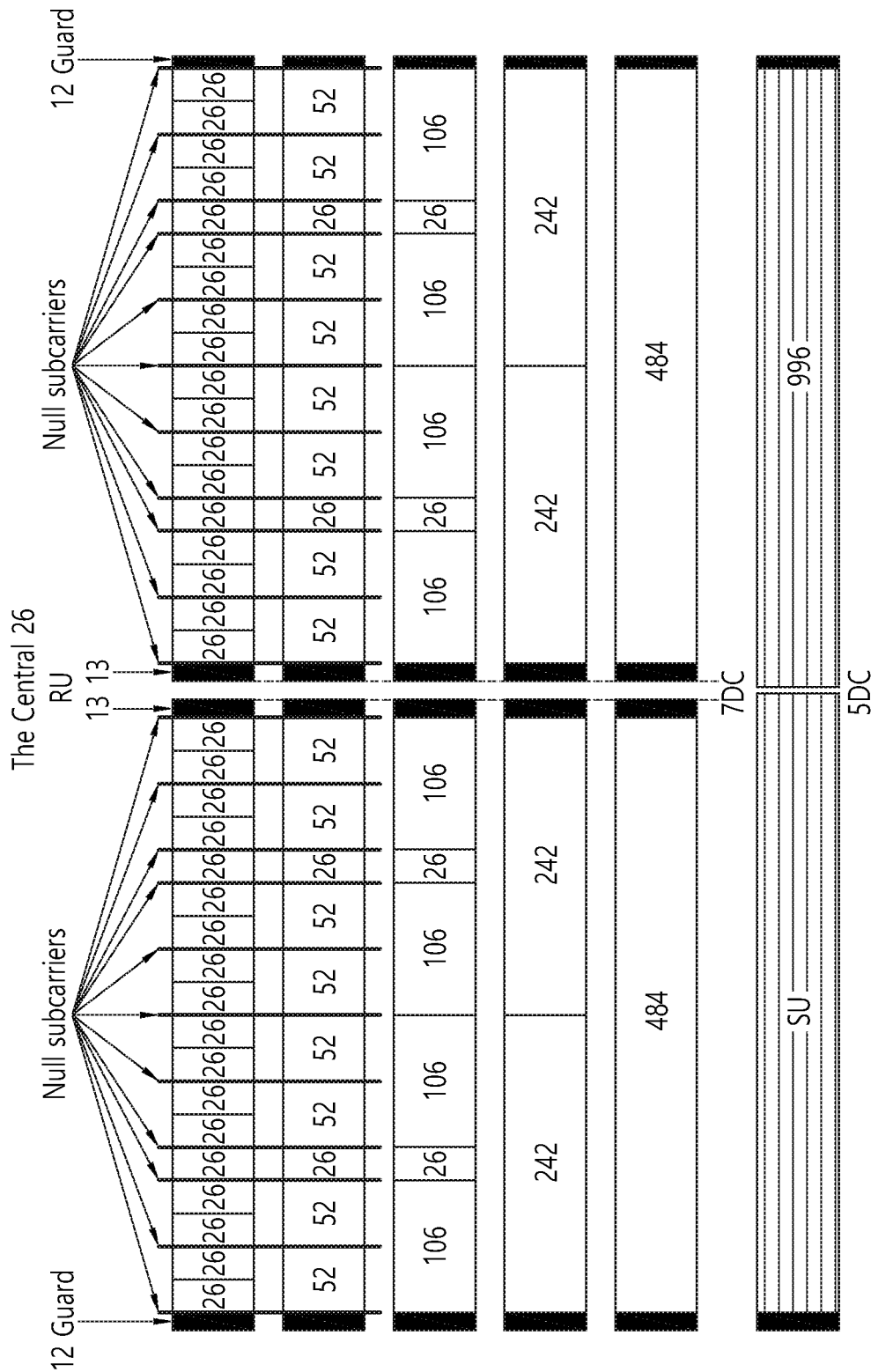
FIG. 6 is a diagram illustrating a layout of resource units used in a band of 80 MHz.

FIG. 6 is a diagram illustrating a layout of resource units (RUs) used in a band of 80 MHz.

Figure 26:
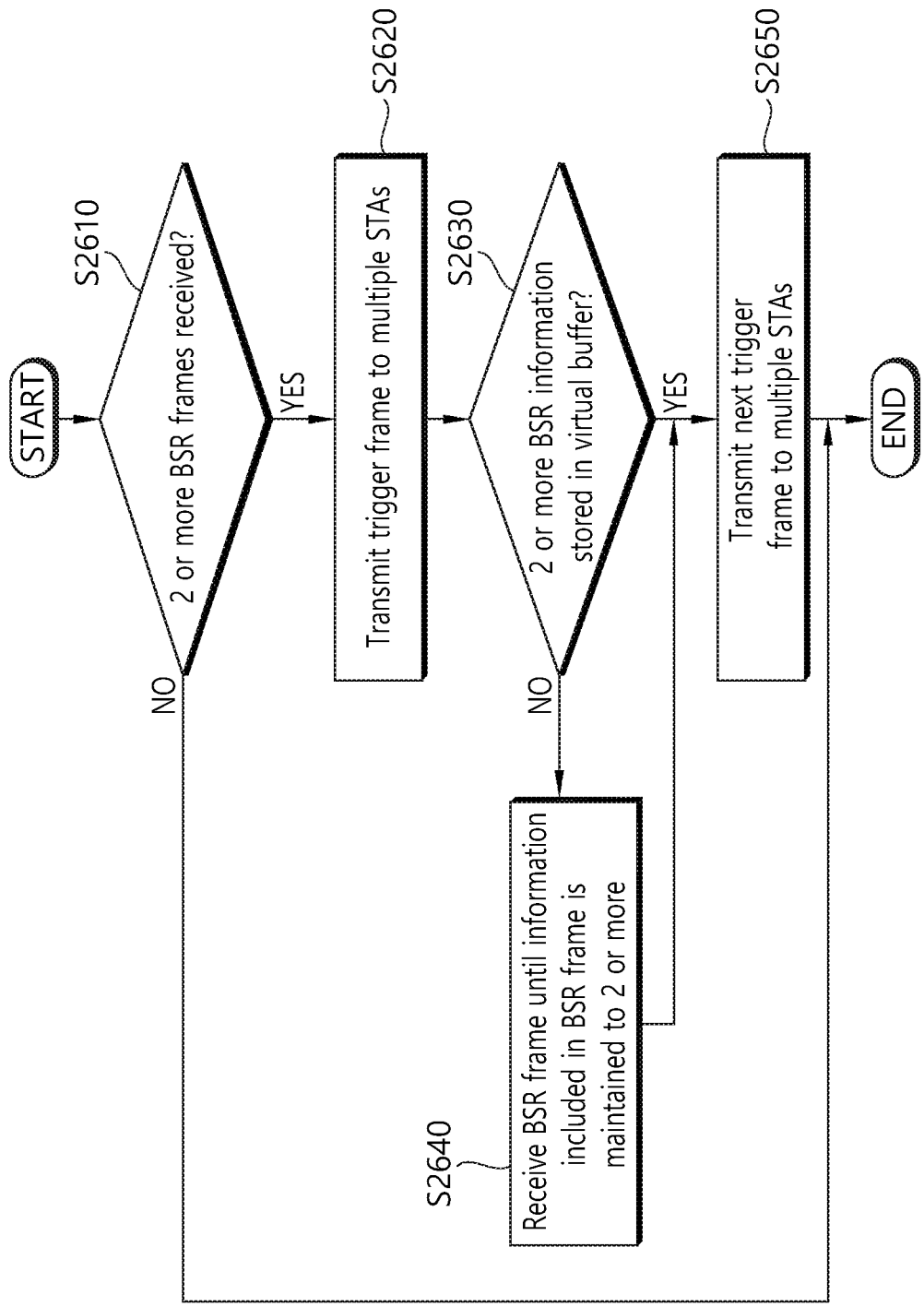
FIG. 26 is a diagram for describing operations of an AP in case the uplink frame corresponding to the trigger frame fails to be received according to FIG. 24 and FIG. 25.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted. Meanwhile, the detailed number of RUs may be modified similarly to one example of each of FIG. 4 or FIG. 5.

Figure 7:
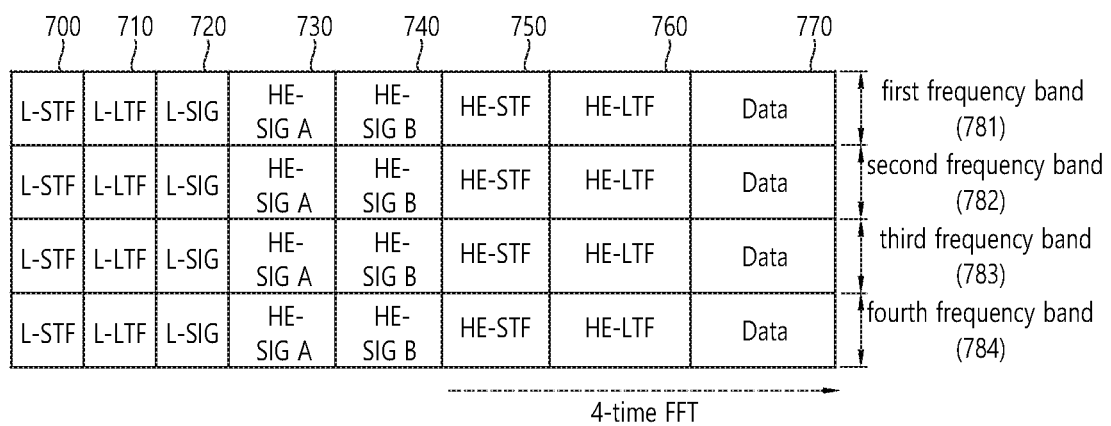
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 730 or an HE-SIG-B 740 may include resource allocation information (alternatively, virtual resource allocation information) for at least one receiving STA.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a term called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
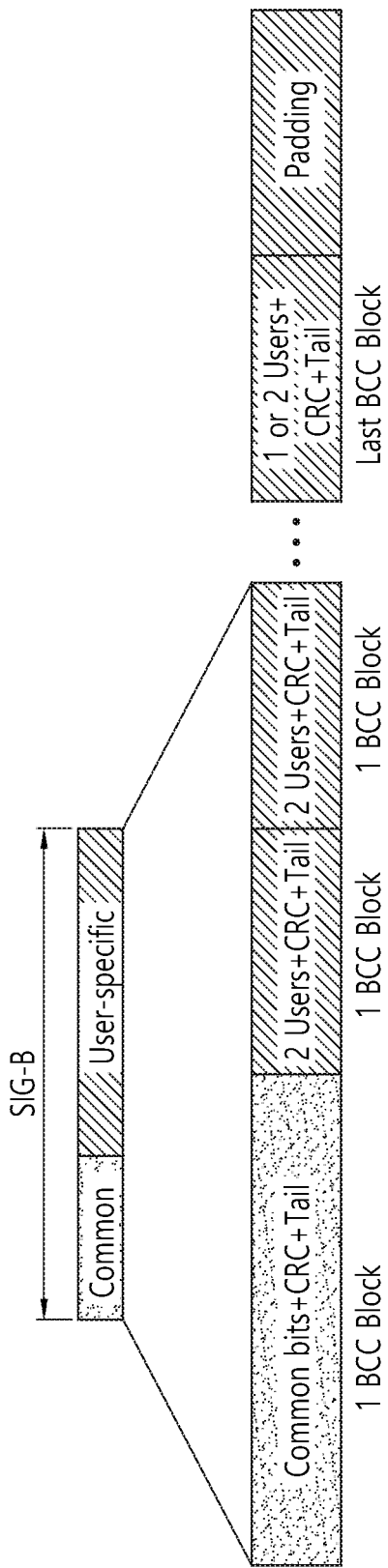
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
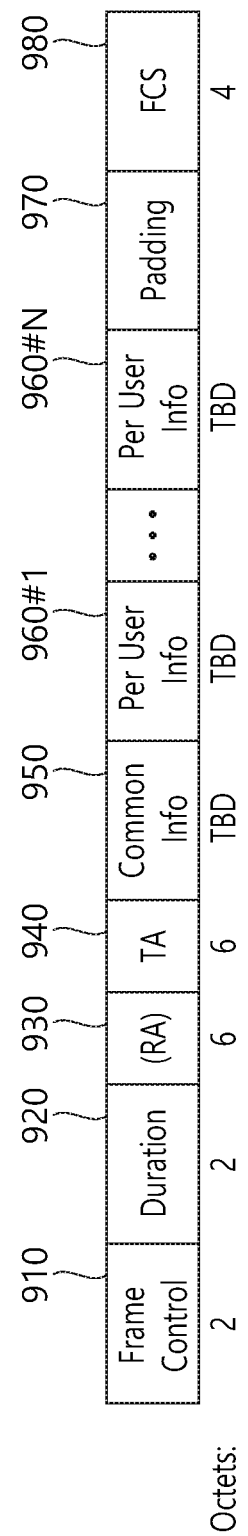
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 10:
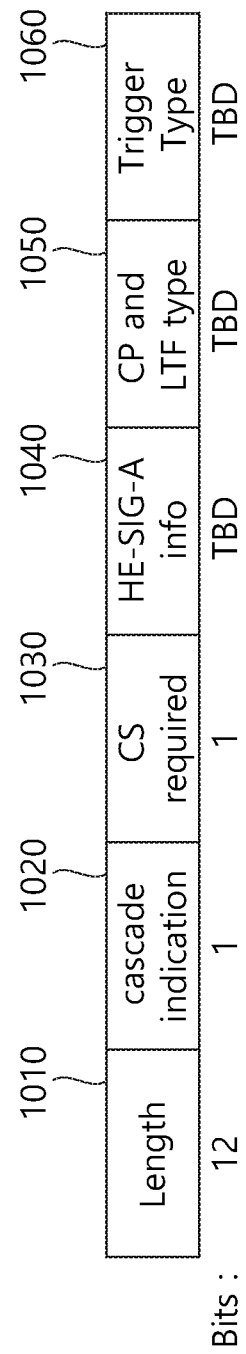
FIG. 10 illustrates an example of a common information field included in a trigger frame.

FIG. 10 illustrates an example of a common information field included in a trigger frame. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Figure 11:
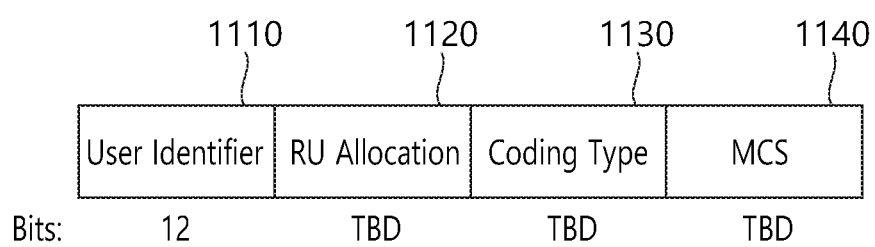
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 of FIG. 11 indicates an identifier of an STA (i.e., receiving STA) to which the per user information corresponds, and an example of the identifier may correspond to all or part of the AID.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted in response to the trigger frame of FIG. 9. For example, when BCC coding is applied to the uplink PPDU, the coding type field 1130 may be set to '1', and when the LDPC coding is applied, the coding type field 1130 may be set to '0'.

Figure 12:
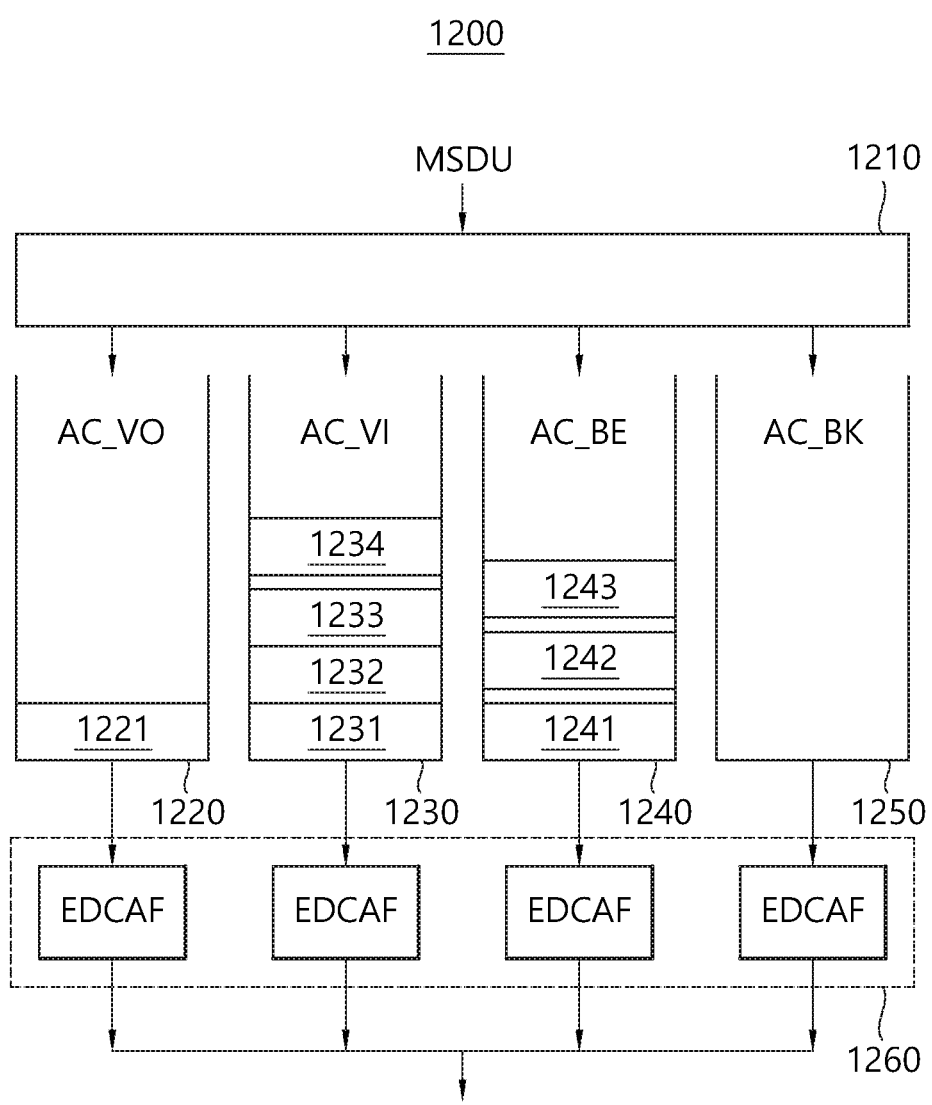
FIG. 12 illustrates an EDCA-based channel access method in a WLAN system.

FIG. 12 illustrates an EDCA-based channel access method in a WLAN system. In the WLAN system, an STA (or AP) performing enhanced distributed channel access (EDCA) may perform channel access according to a plurality of user priorities defined with respect to traffic data.

The EDCA for the transmission of a Quality of Service (QoS) data frame based on priority levels of multiple users defines four access categories (ACs) (background (AC_BK), best effort (AC_BE), video (AC_VI), and voice (AC_VO)). The EDCA may map traffic data, such as a MAC service data unit (MSDU), which are transferred from a logical link control (LLC) layer and a medium access control (MAC) layer, as shown below in <Table 1>.

Table 1 indicates an exemplary mapping between user priority levels and ACs.

TABLE 1

| Priority | User priority | Access category (AC) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

A transmission queue and an AC parameter may be defined for each AC. A difference in transmission priority levels between the ACs may be implemented between the ACs based on AC parameter values, which are configured to be different from one another.

In performing a backoff procedure for transmitting a frame belonging to the AC, the EDCA may respectively use an arbitration interframe space (AIFS)[AC], a CWmin[AC], and a CWmax[AC] instead of a DCF interframe space (DIFS), a CWmin, and a CWmax, which correspond to parameters for a backoff procedure based on a distributed coordination function (DCF).

For reference, exemplary default values of the parameters corresponding to each AC are shown below in Table 2.

TABLE 2

| AC | $CW_{min}$ [AC] | $CW_{max}$ [AC] | AIFS [AC] | TXOP limit [AC] |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

The EDCA parameters being used in the backoff procedure for each AC may be configured to have a default value or may be loaded in a beacon frame so as to be delivered to each STA from the AP. As the value between the AIFS[AC] and the CWmin[AC] becomes lower, the priority level becomes higher, and, accordingly, channel access delay becomes shorter, thereby allowing a larger number of bands to be used in a given traffic environment.

The EDCA parameter set element may include information on channel access parameters for each AC (e.g., AIFS [AC], CWmin[AC], CWmax[AC]).

When a collision occurs between the STAs, while the STA is transmitting a frame, the backoff procedure of the EDCA, which generates a new backoff count, is similar to the conventional backoff procedure of the DCF. However, the backoff procedure of the EDCA, which is distinguished for each AC, may be performed based on the EDCA parameters, which are individually set up (or configured) for each AC. The EDCA parameter functions as an important means that can distinguish the channel access of diverse user priority traffic.

An adequate configuration of EDCA parameter values defining a different channel access procedure for each AC may not only optimize network performance but may also increase a transmission effect in accordance with the priority level of the traffic at the same time. Therefore, the AP should be capable of performing a function of overall management and control of EDCA parameters in order to ensure a fair medium access to all STAs participating in the network.

Referring to FIG. 12, one STA (or AP) 1200 may include a virtual mapper 1210, a plurality of transmission queues 1220 to 1250, and a virtual collision handler 1260.

The virtual mapper 1210 of FIG. 12 may perform a function of mapping an MSDU that is received from a logical link control (LLC) layer to transmission queues corresponding to each AC in accordance with the Table 1, which is presented above.

The plurality of transmission queues 1220 to 1250 may perform the functions of individual EDCA contention entities for wireless media access within an STA (or AP).

For example, the transmission queue 1220 of the AC_VO type of FIG. 12 may include one frame 1221 for a second STA (not shown). The transmission queue 1230 of the AC_VI type may include 3 frames 1231 to 1233 for a first STA (not shown) and one frame 1234 for a third STA in accordance with a transmission order by which the frames are to be transmitted to a physical layer.

The transmission queue 1240 of the AC_BE type of FIG. 12 may include one frame 1241 for a second STA (not shown), and one frame 1242 for a third STA (not shown), and one frame 1243 for a second STA (not shown) in accordance with a transmission order by which the frames are to be transmitted to a physical layer.

As an example, the transmission queue 1250 of the AC_BK type of FIG. 12 does not include a frame that is to be transmitted to a physical layer.

In case one or more ACs having completed the backoff at the same time exist(s), the collision between the ACs may be coordinated in accordance with an EDCA function (EFCAF) included in the virtual collision handler 1260. More specifically, the frame included in the AC having the higher priority level is transmitted beforehand, and the other ACs may increase their contention window values, so as to newly update their backoff counters.

A transmission opportunity (TXOP) may be initiated (or started) when a channel is accessed in accordance with an EDCA rule. When two or more frames are accumulated in one AC, and if an EPCA TXOP is acquired, the AC of an EDCA MAC layer may attempt to perform multiple frame transmissions. If the STA has already transmitted one frame, and if the STA is also capable of receiving the transmission of a next frame existing in the same AC within the remaining TXOP time and along with its ACK, the STA may attempt to perform the transmission of the corresponding frame after an SIFS time interval.

A TXOP limit value may be configured as a default value in the AP and the STA, and a frame that is related to the TXOP limit value may be transported (or delivered) to the STA from the AP.

If the size of the data frame that is to be transmitted exceeds the TXOP limit value, the AP may perform fragmentation on the corresponding frame into a plurality of smaller frames. Subsequently, the fragmented frames may be transmitted within a range that does not exceed the TXOP limit value.

Figure 13:
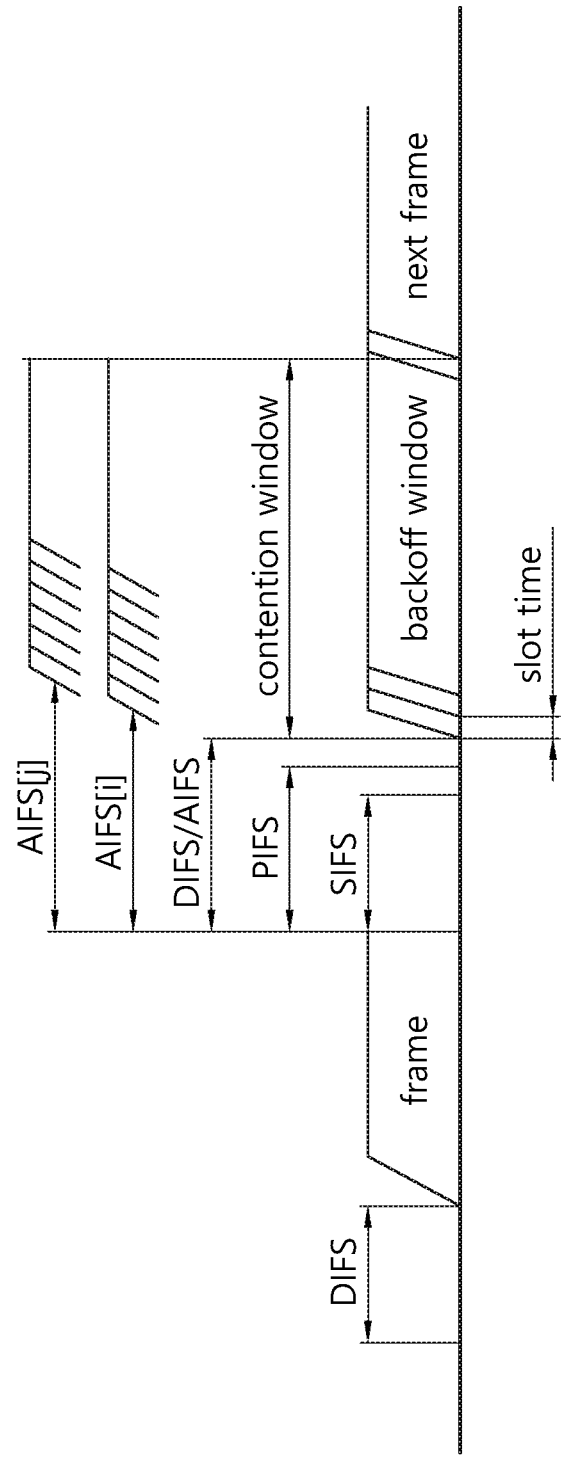
FIG. 13 is a conceptual diagram illustrating a backoff procedure according to EDCA.

FIG. 13 is a conceptual diagram illustrating a backoff procedure according to EDCA.

In an 802.11 MAC layer, a plurality of STAs may share a wireless medium based on a distributed coordination function (hereinafter referred to as 'DCF'). In order to control the collision between STAs, the DCF may use a carrier sense multiple access/collision avoidance (hereinafter referred to as CSMA/CA) as its access protocol.

In a channel access method using the DCF, if a medium is not used during one DCF inter frame space (DIFS) or more (i.e., if the channel is idle during a DIFS), the STA may transmit an MPDU the transmission of which is imminent (or an MPDU that is to be transmitted soon). When it is determined by the carrier sensing mechanism that the wireless medium is being used, the STA may determine the size of the contention window (hereinafter referred to as 'CW') by using a random backoff algorithm and may then perform a backoff procedure.

In order to perform the backoff procedure, STA selects a random time slot. The selected time slot is referred to as a backoff time. The STA that has selected a relatively short backoff time, among the backoff times that are selected by a plurality of STAs, may acquire a transmission opportunity (hereinafter referred to as 'TXOP'), which allows the corresponding STA to access a medium at a higher priority.

The other STAs may suspend the remaining backoff time and may be on stand-by until the transmission of the STA transmitting the frame is completed. Once the frame transmission of the STA is completed, the remaining STAs perform contention with the backoff time so as to be capable of occupying the wireless medium.

The transmission method that is based on the above-described DCF performs the function of preventing collision, which may occur when a plurality of STAs simultaneously transmit frames, from occurring. However, the channel access method using DCF does not have the concept of transmission priority levels. More specifically, when the DCF is used, the quality of service (QoS) of the traffic that is intended to be transmitted by the STA may not be ensured.

In order to resolve the above-described problem, a hybrid coordination function (hereinafter referred to as 'HCF'), which is new coordination function, is defined in 802.11e. The newly defined HCF has a capability (or performance) that is more enhanced than the legacy channel access performance (or capability) of the DCF. For the purpose of enhancing the QoS, the HCF may also use two different types of channel access methods, which correspond to a HCF controlled channel access (HCCA) of a polling method and a contention based enhanced distributed channel access (EDCA).

Traffic categories (hereinafter referred to as 'TC') for the transmission priority levels may be defined in the EDCA and the HCCA. Priority levels for performing channel access may be determined based on the above-described TC.

More specifically, the HCCA scheme uses a hybrid coordinator (hereinafter referred to as 'HC'), which is located in the AP for performing central management of the wireless medium access. Since the HC performs an integrated central management of the wireless medium, contention between the STAs for the wireless medium access may be reduced. Accordingly, since the data frame exchange may be maintained at a short transmission delay time (SIFS), the network efficiency may be increased.

The HC defines QoS attributes of a specific traffic being requested by an application service as parameters for QoS support and, then, controls transmission delay and scheduling. Before transmitting the parameterized QoS traffic, the HC first configures a virtual connection, which is referred to as a traffic stream. The traffic stream may be configured for all of an uplink from an STA to the AP, a downlink from the AP to an STA, and a direct link from an STA to another STA.

In order to configure a traffic stream between the AP and an STA, traffic attributes, such as frame size, average transmission speed, and so on, and QoS request parameters, such as delay time, are exchanged through a mutual agreement process. The HC performs a function of controlling allocation of medium access time by using a TXOP.

Referring to FIG. 13, each traffic data being transmitted from the STA may be assigned with a priority level, and a backoff procedure may be performed based on a contention based EDCA method. For example, the priority levels being assigned to each traffic may be divided into 8 different levels. As described above, one STA may have different output queues (or transmission queues) in accordance with the priority levels, and each output queue operates in accordance with the EDCA rule. Each output queue may transmit traffic data by using a different Arbitration Interframe Space (AIFS) in accordance with each priority level instead of using the conventionally used DCF Interframe Space (DIFS). Additionally, in case an STA is scheduled to transmit traffic each having a different priority level at a same time point, collision within the STA may be prevented by performing transmission starting from the traffic having the highest priority level.

Hereinafter, the device according to the exemplary embodiment of the present invention may correspond to a device that is capable of supporting both a wireless LAN system and a cellular system. More specifically, the device may be interpreted as a UE supporting a cellular system or an STA supporting a wireless LAN system.

All timing may be decided by referring to physical layer interface primitives, i.e., a PHY-TXEND.confirm primitive, a PHYTXSTART.confirm primitive, a PHY-RXSTART.indication primitive, and a PHY-RXEND.indication primitive.

For simplicity in the description of this specification, a frame interval (IFS) of 802.11 will hereinafter be described.

For example, an inter-frame space (or Inter-Frame Spacing) (IFS) may correspond to a reduced interframe space (RIFS), a short interframe space (SIFS), a PCF interframe space (PIFS), a DCF interframe space (DIFS), an arbitration interframe space (AIFS), or an extended interframe space (EIFS).

Different IFSs may be determined in accordance with attributes specified by the physical layer of the STA regardless of the bit rate of the STA. An IFS timing may be defined as a time gap within the wireless medium. The IFS timing excluding AIFS is fixed for each physical layer.

For example, the SIFS has the shortest time gap among the IFS mentioned above. Accordingly, the SIFS may be used when an STA occupying a wireless medium is required to maintain its occupation of the medium without any interruption by another STA during a section, wherein a frame exchange sequence is performed.

More specifically, by using the shortest gap between transmissions within a frame exchange sequence, priority may be assigned (or given) for completing the frame exchange sequence that is currently being performed. Also, an STA performing access to a wireless medium by using the SIFS timing may initiate (or start) transmission from an SIFS boundary without determining whether or not the medium is busy.

A duration of an SIFS for a specific physical (PHY) layer may be defined by an aSIFSTime parameter. For example, in the physical (PHY) layer of the IEEE 802.11a, IEEE 802.11g, IEEE 802.11n, and IEEE 802.11ac standards (or specifications), the SIFS value is equal to 16 μs.

For example, the STA using the PIFS may be assigned with a priority level used in order to provide the STA with a second highest priority level following the priority level of the SIFS. In other words, the PIFS may be used in order to acquire priority for accessing the wireless medium.

For example, the DIFS may be used by an STA transmitting a data frame (MPDU) and a management frame (Mac Protocol Data Unit (MPDU)) based on the DCF. In this case, after the received frame and backoff time are expired, when it is determined by a carrier sense (CS) mechanism that the medium is in an idle state, the STA may transmit a frame.

Figure 14:
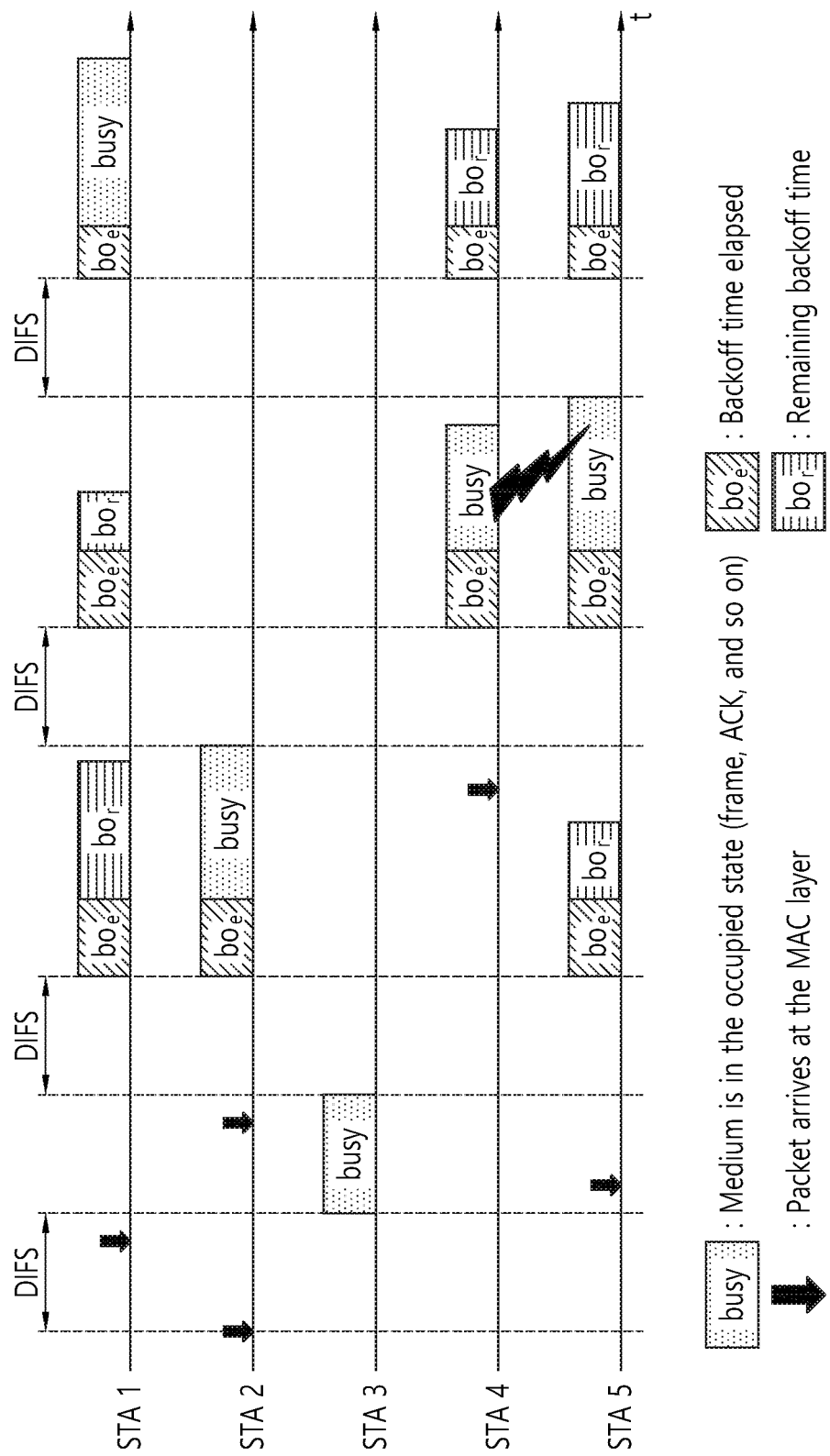
FIG. 14 is a diagram for describing a backoff cycle and a frame transmission procedure in a wireless communication system of this specification.

FIG. 14 is a diagram for describing a backoff cycle and a frame transmission procedure in a wireless communication system of this specification.

Referring to FIG. 12 to FIG. 14, when a specific medium is shifted from an occupy or busy state to an idle state, a plurality of STAs may attempt to perform data (or frame) transmission. At this point, as a solution for minimizing collision between the STAs, each STA may select a random backoff time in accordance with the backoff procedure and may attempt to perform transmission after standing by during a lot time corresponding to the selected random backoff time.

The backoff procedure that is mentioned in this specification may correspond to a concept including the following operations.

By performing a countdown of the random backoff time, which is configured in the backoff counter, the STA may attempt to perform channel access. For example, the random backoff time may be determined based on a backoff procedure according to Equation 1 shown below.

Additionally, in case re-transmission is required to be performed due to a transmission collision occurring in accordance with the backoff procedure, the STA may attempt to perform channel access by re-configuring a random backoff time by using Equation 2 shown below.

In order to initiate (or start) the backoff procedure, each STA may configure a random backoff time (Tb[i]) to a backoff counter, which individually exists in each STA. The random backoff time may be calculated as a pseudo-random integer value by using Equation1 shown below.

$$T_b[i] = \text{Random}(i) \times \text{SlotTime} \quad \text{[Equation 1]}$$

Random(i) of Equation 1 refers to a function generating a random integer between 0 and CW[i] by using uniform distribution. CW[i] represents a contention window existing between a minimum contention window CWmin[i] and a maximum contention window CWmax[i], and i represents a traffic priority level. More specifically, i may indicate AC_VO, AC_VI, AC_BE, or AC_BK in accordance with the QoS of the traffic data.

Typically, the value of CWmin[AC] in Table 2 may be configured as the CW[i]. It shall be understood that the CWmin[i] and the CWmax[i], which are mentioned above, may respectively correspond to CWmin[AC] and CWmax[AC] of Table 2.

Additionally, each time a collision occurs when performing transmission, a new contention window $CW_{new}[i]$ may be calculated by using a previous (or old) window $CW_{old}[i]$ based on Equation 2, which is shown below.

$$CW_{new}[i] = ((CW_{old}[i]+1) \times PF) - 1 \quad \text{[Equation 2]}$$

Herein, the PF value may be calculated in accordance with a procedure that is defined in the IEEE 802.11e standard. For example, the PF value may be configured to be equal to '2'. The CWmin[i], AIFS [i], and PF values may be transmitted the AP by using a QoS parameter set element, which corresponds to a management frame. Alternatively, the above-mentioned QoS parameter set element may be configured in advance by the AP and the STA.

The SlotTime of Equation 1 may be used for accommodating variability. The SlotTime of Equation 1 may be used for providing sufficient time so as to allow a preamble of a transmitting STA to be sufficiently discovered by a neighboring STA. The SlotTime of Equation 1 may be used for defining the above-described PIFS and DIFS. For the SlotTime of Equation 1, a SlotTime for a specific physical layer (PHY) may be defined by the aSlotTime parameter. In the physical (PHY) layer of the IEEE 802.11a, IEEE 802.11g, IEEE 802.11n, and IEEE 802.11ac, the SlotTime value is equal to 9 μs.

Referring to FIG. 14, when a packet for STA 3 reaches the MAC layer of STA 3, STA 3 may determine whether or not the medium is in an idle state during a DIFS and may then immediately transmit a frame. Although the inter frame space (IFS) of FIG. 14 is illustrated as a DIFS, it should be understood that this specification will not be limited only to this.

Meanwhile, the remaining STAs may monitor that the medium is in a busy state and may then enter a standby mode. Meanwhile, data that are to be transmitted to each of STA 1, STA 2, and STA 5 may be generated. Each STA may be on standby for as long as a DIFS and may then perform countdown of an individual random backoff time, which is selected by each STA.

Referring to FIG. 14, a case where the STA 2 selects the smallest (or shortest) backoff time and a case where the STA 1 selects the largest (or longest) backoff time are illustrated. FIG. 14 illustrates a case where the remaining backoff time of the STA 5 is shorter than the remaining backoff time of the STA 1, at a time point where the backoff counting of the random backoff time, which is selected by the STA 2, is completed and where the frame transmission is initiated.

Subsequently, while the STA 2 occupies the medium, the STA 1 and the STA 5 may suspend the countdown and may go on standby. Thereafter, when the medium occupation of the STA 2 is completed, and when the STA 2 returns to its idle state, the STA 1 and the STA 5 may go on standby for as long as a DIFS and may then resume the countdown of their remaining backoff time. In this case, since the remaining backoff time of the STA 5 is shorter than that of the STA 1, the STA 5 may transmit a frame earlier than the STA 1.

Meanwhile, while the STA 2 occupies the medium, data that are to be transmitted by the STA 4 may reach the MAC layer of the STA 4. At this point, when the medium is in the idle state, the STA 4 may go on standby for as long as a DIFS and may then count down the remaining random backoff time, which is selected by the STA 4.

FIG. 14 illustrates a case where the remaining backoff time of the STA 5 coincidentally matches with the random backoff time of the STA 4, and, in this case, a collision may occur between the STA 4 and the STA 5. When a collision occurs between STAs, both the STA 4 and the STA 5 fail to receive an ACK, and, accordingly, both STAs fails to perform data transmission.

In this case, each of the STA 4 and the STA 5 may calculate a new contention window ($CW_{new}[i]$) according to Equation 2 which is presented above. Subsequently, each of the STA 4 and the STA 5 may perform a countdown of the respective random backoff time, which is newly calculated according to Equation 1, which is presented above.

Meanwhile, due to the transmission of the STA 4 and the STA 5, the STA 1 may go on standby while the medium is in the busy state (or occupied state). Subsequently, when the medium is shifted to the idle state, the STA 1 may go on standby for as long as a DIFS and may then resume its backoff counting. Thereafter, the STA 1 may transmit a frame when the backoff count exceeds the remaining backoff time.

In addition to physical carrier sensing by which the AP and/or STA directly senses the medium, the CSMA/CA mechanism may also include virtual carrier sensing.

Virtual carrier sensing is used for compensating for any problems that may occur during access to the medium, such as a hidden node problem, and so on. For the virtual carrier sensing, the MAC of a WLAN system uses a Network Allocation Vector (NAV). Herein, the NAV corresponds to a value, which corresponds to the time remaining until the medium shifts to an available state, that is indicated by an AP and/or STA currently using or having the authority to use the medium to another AP and/or STA. Therefore, the value that is configured as the NAV corresponds to a time period during which the usage of the medium by the AP and/or STA transmitting the corresponding frame is scheduled, and, during the corresponding time period, medium access of the STA receiving the NAV value is prohibited.

Figure 15:
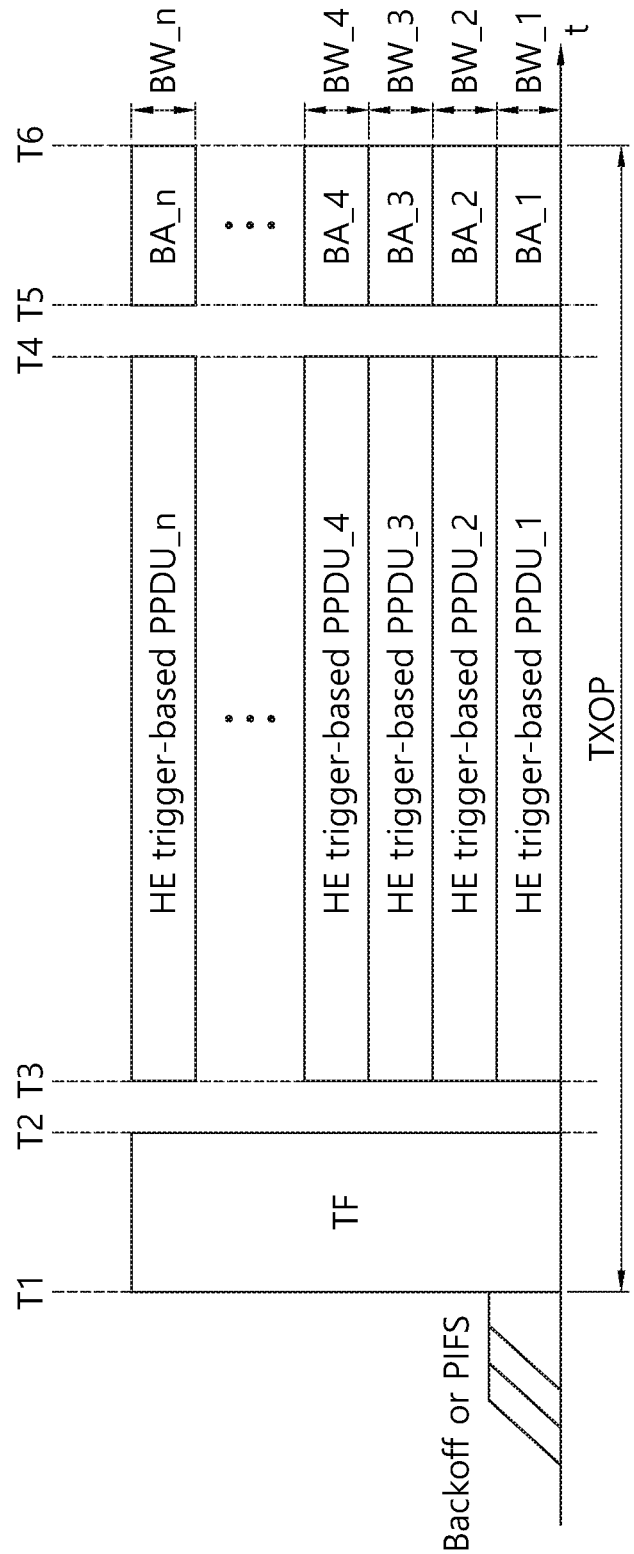
FIG. 15 and FIG. 16 are diagrams for describing an uplink transmission of multiple users according to an exemplary embodiment of this specification.
Figure 16:
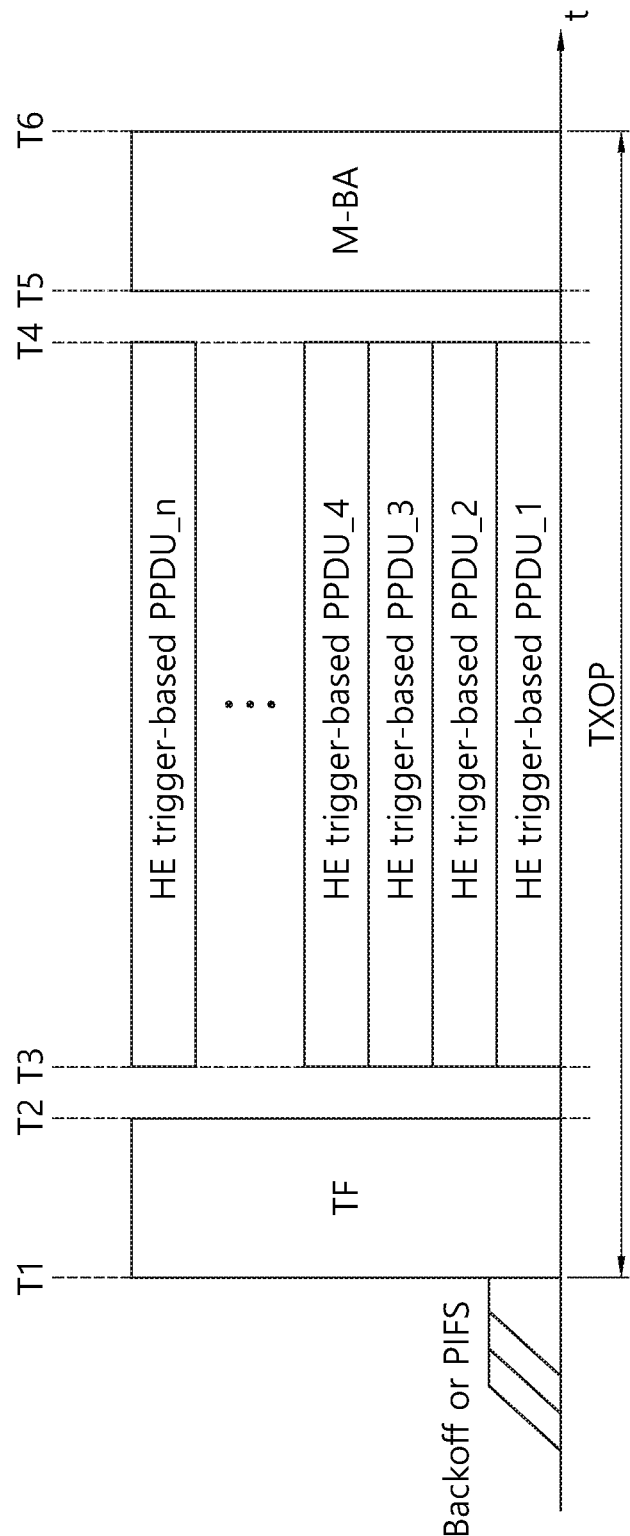

FIG. 15 and FIG. 16 are diagrams for describing an uplink transmission of multiple users according to an exemplary embodiment of this specification.

Referring to FIG. 15, a horizontal axis represents time (t). And, it shall be understood that the vertical axis (not shown) of FIG. 15 may represent a presence or absence of a frame, which is expressed in the viewpoint of the frequency.

If a channel is idle during a backoff operation or during a PCF inter-frame space (PIFS), an access point (AP) of FIG. 15 may perform downlink (hereinafter referred to as 'DL') transmission of a trigger frame to a plurality of STAS during a first section (T1~T2, a downlink (DL) section).

The trigger frame (TF) of FIG. 15 may correspond to a frame that solicits an uplink frame of multi-users. More specifically, in order to receive a plurality of trigger-based frames from the plurality of STAs, the trigger frame may be transmitted.

The trigger frame may include information (e.g., RU information) associated with radio resources, which are individually configured (or set up) by the AP for the reception of the plurality of trigger-based frames.

Subsequently, the AP and the plurality of STAs may be on standby during a second section (T2~T3). For example, the second section (T2~T3) may correspond to a short inter-frame space (SIFS).

Afterwards, the AP may receive the plurality of trigger-based frames from the plurality of STAs. More specifically, first to $n^{th}$ trigger-based PPDUs (HE trigger-based PPDU_1~HE trigger-based PPDU_n) of FIG. 15 may be received by the AP through radio resources being allocated by the trigger frame (TF) during an overlapping third section (T3~T4, uplink (UL) section).

For example, the first trigger-based PPDU (HE trigger-based PPDU_1) of FIG. 15 may correspond to a trigger-based frame being transmitted by a first STA. The first trigger-based PPDU (HE trigger-based PPDU_1) may be transmitted through a first bandwidth (BW_1). For example, the first bandwidth (BW_1) may correspond to 20 MHz.

The second trigger-based PPDU (HE trigger-based PPDU_2) of FIG. 15 may correspond to a trigger-based frame being transmitted by a second STA. The second trigger-based PPDU (HE trigger-based PPDU_2) may be transmitted through a second bandwidth (BW_2). For example, the second bandwidth (BW_2) may correspond to 20 MHz.

The third trigger-based PPDU (HE trigger-based PPDU_3) of FIG. 15 may correspond to a trigger-based frame being transmitted by a third STA. The third trigger-based PPDU (HE trigger-based PPDU_3) may be transmitted through a third bandwidth (BW_3). For example, the third bandwidth (BW_3) may correspond to 20 MHz.

The fourth trigger-based PPDU (HE trigger-based PPDU_4) of FIG. 15 may correspond to a trigger-based frame being transmitted by a fourth STA. The fourth trigger-based PPDU (HE trigger-based PPDU_4) may be transmitted through a fourth bandwidth (BW_4). For example, the fourth bandwidth (BW_4) may correspond to 20 MHz.

In other words, in case a plurality of STAs correspond to first to $n^{th}$ STAs (wherein n is an integer), the $n^{th}$ trigger-based PPDU (HE trigger-based PPDU_n) of FIG. 15 may correspond to a trigger-based frame being transmitted by the $n^{th}$ STA.

Subsequently, the AP and the plurality of STAs may be on standby during a fourth section (T4~T5). For example, the fourth section (T4~T5) may correspond to a short inter-frame space (SIFS).

Thereafter, the AP may transmit a plurality of acknowledgement (ACK) frames corresponding to the received plurality of trigger-based frames. The ACK frame of FIG. 15 may correspond to a block ACK (hereinafter referred to as 'BA') frame that can verify the reception of at least one MPDU included in the PPDU.

A plurality BA frames (BA_1~BA_n), which are shown in FIG. 15, may be transmitted through a bandwidth through which the trigger-based frames corresponding to each BA frame are received. The plurality of BA frames (BA_1~BA_n) may be transmitted during a fifth section (T5~T6, downlink (DL) section). For example, a first BA frame (BA_1) may correspond to a first HE trigger-based PPDU (HE trigger-based PPDU_1), and the first BA frame (BA_1) may be transmitted to the first STA through a first bandwidth (BW_1).

For example, a second BA frame (BA_2) may correspond to a second HE trigger-based PPDU (HE trigger-based PPDU_2), and the second BA frame (BA_2) may be transmitted to the second STA through a second bandwidth (BW_2). A third BA frame (BA_3) may correspond to a third HE trigger-based PPDU (HE trigger-based PPDU_3), and the third BA frame (BA_3) may be transmitted to the third STA through a third bandwidth (BW_3).

For example, a fourth BA frame (BA_4) may correspond to a fourth HE trigger-based PPDU (HE trigger-based PPDU_4), and the fourth BA frame (BA_4) may be transmitted to the fourth STA through a fourth bandwidth (BW_4). A $n^{th}$ BA frame (BA_n) may correspond to an $n^{th}$ HE trigger-based PPDU (HE trigger-based PPDU_n), and the $n^{th}$ BA frame (BA_n) may be transmitted to the $n^{th}$ STA through an $n^{th}$ bandwidth (BW_n).

As shown in FIG. 15, in order to notify the successful reception of the plurality of uplink frames, the AP may transmit a plurality of ACK frames corresponding to each of the plurality of trigger-based frames. Each ACK frame of FIG. 15 may include association identifier (AID) information corresponding to each STA.

Additionally, as shown in FIG. 15, a transmission opportunity (TXOP) section for uplink multi-user (hereinafter referred to as 'UL MU') operations may include the first section to the fifth section (T1~T5).

Information indicating a time length of the transmission opportunity (TXOP) section shown in FIG. 15 may be included in a trigger frame (TF). Accordingly, the STA that has received the trigger frame (TF) may recognize the time length of the transmission opportunity (TXOP) section.

Referring to FIG. 16, it should be understood that, with the exception for the part related to the ACK frame, the same description provided in FIG. 15 may be applied for the description of FIG. 16.

However, as shown in FIG. 16, in order to notify the successful reception of the plurality of uplink frames (HE trigger-based PPDU_1~HE trigger-based PPDU_n), the AP may transmit one multi-ACK frame (M-BA).

The multi-ACK frame (M-BA) of FIG. 16 may include association identifier (AID) information corresponding to a plurality of STAs.

Figure 17:
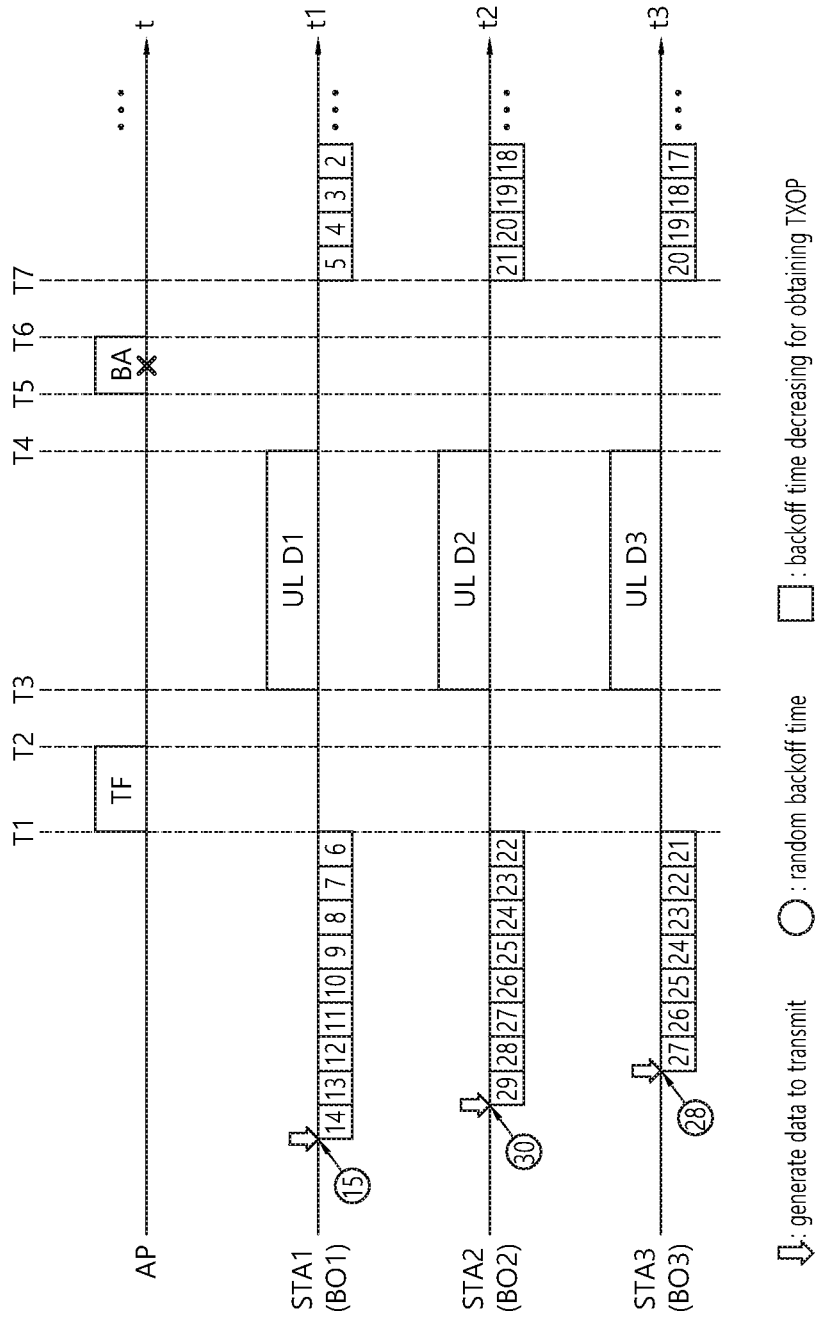
FIG. 17 is a diagram showing an EDCA backoff operation in case an ACK frame fails to be received according to an exemplary embodiment of this specification.

FIG. 17 is a diagram showing an EDCA backoff operation in case an ACK frame fails to be received according to an exemplary embodiment of this specification.

A horizontal axis of AP shown FIG. 17 represents time (t), and a vertical axis (not shown) may represent a presence or absence of a frame, which is expressed in the viewpoint of the frequency.

Similarly, the horizontal axis of each of the first to third STAs (STA1, STA2, STA3) may represent time (t1, t2, t3). The vertical axis (not shown) of each of the first to third STAs (STA1, STA2, STA3) may represent a presence or absence of a frame, which is expressed in the viewpoint of the frequency.

Whether or not the STA is capable of performing channel access using the EDCA method may be determined in the association step during which the STA is associated to the AP. For simplicity in the description of FIG. 17, it will be assumed that the first to third STAs (STA1, STA2, STA3) are capable of performing channel access using the EDCA method.

Referring to FIG. 12 to FIG. 17, when data reach the MAC layer of the first to third STAs (STA1, STA2, STA3), each STA may perform the countdown operation of the backoff counter for the channel access.

For the description of the backoff counter shown in FIG. 17, the same description of the backoff counter, which is presented above in FIG. 13, may be applied. More specifically, when data reach the MAC layer, each STA may configure a random backoff time (hereinafter referred to as 'RBT'), which is calculated based on Equation 1.

For simplicity in the description, it will be assumed that one unit of the SlotTime shown in Equation 1 corresponds to one slot. For example, if '10' is selected by a random function (Random(i)) of Equation 1, which is presented above, the random backoff time (RBT) may be expressed as 10 slots.

Each STA may perform countdown of the random backoff time (RBT), which is configured in the backoff counter, in slot time units. For example, the countdown of 10 slots may be performed in a descending order starting from Slot 9 to Slot 0. And, when the STA reaches Slot 0, the STA may acquire channel access to the wireless medium.

As described above in FIG. 13 and FIG. 14, a random function (Random(i)) may select a random integer value within a range starting from 0 to contention window (CW [i]). Generally, CWmin[AC] is set up in the contention window (CW[i]), and, when a collision occurs, the contention window is re-calculated in accordance with Equation 2, which is presented above.

For simplicity in the description of the drawings that will hereinafter be described, it will be assumed that the CWmin [AC] value corresponding to each access category (AC) is set up (or configured) in the contention window (OWN).

More specifically, in case the data reaching the MAC layer of STA1 correspond to the AC_VI type, according to Table 2, which is presented above, CWmin[AC_VI] may be equal to '15', and CWmax[AC_VI] may be equal to '31'. In accordance with the above-mentioned assumption, CWmin [AC_VI] '15' may be set up in the contention window (OWN).

In order to perform a first backoff procedure (BO1), the random function (Random(i)) of STA1 may randomly select an integer value within a range starting from '0' to '15'. For example, STA1 of FIG. 17 corresponds to a case where the random value is set to '15'. And, in this case, the random backoff time (RBT) of STA1 is equal to 15 slots.

Subsequently, STA1 may perform the countdown of the random backoff time (RBT) up to a point before a transmission point (T1) of the trigger frame. For example, STA1 may decrease 9 slots up to a point before the transmission point (T1) of the trigger frame.

More specifically, in case the data reaching the MAC layer of STA2 correspond to the AC_BE type, according to Table 2, which is presented above, CWmin[AC_BE] may be equal to '31', and CWmax[AC_BE] may be equal to '1023'. In accordance with the above-mentioned assumption, CWmin[AC_BE] '31' may be set up in the contention window (CW[i]).

In order to perform a second backoff procedure (BO2), the random function (Random(i)) of STA2 may randomly select an integer value within a range starting from '0' to '31'. For example, STA2 of FIG. 17 corresponds to a case where the random value is set to '30'. And, in this case, the random backoff time (RBT) of STA2 is equal to 30 slots.

Subsequently, STA2 may perform the countdown of the random backoff time (RBT) up to a point before a transmission point (T1) of the trigger frame. For example, STA2 may decrease 8 slots up to a point before the transmission point (T1) of the trigger frame.

More specifically, in case the data reaching the MAC layer of STA3 correspond to the AC_BK type, according to Table 2, which is presented above, CWmin[AC_BK] may be equal to '31', and CWmax[AC_BK] may be equal to '1023'. In accordance with the above-mentioned assumption, CWmin[AC_BK] '31' may be set up in the contention window (CW[i]).

In order to perform a third backoff procedure (BO3), the random function (Random(i)) of STA3 may randomly select an integer value within a range starting from '0' to '31'. For example, STA3 of FIG. 17 corresponds to a case where the random value is set to '28'. And, in this case, the random backoff time (RBT) of STA3 is equal to 28 slots.

Subsequently, STA3 may perform the countdown of the random backoff time (RBT) up to a point before a transmission point (T1) of the trigger frame. For example, STA3 may decrease 7 slots up to a point before the transmission point (T1) of the trigger frame.

In the first section (T1~T2) of FIG. 17, a trigger frame (TF) may be transmitted. When it is indicated by the carrier sensing (CS) mechanism that the wireless medium is busy, each STA may suspend the countdown operation performed by the backoff counter of each STA.

Additionally, with the exception for FIG. 20, which will be described later on in detail, it will be assumed that the trigger frame (TF) includes identifier information of the first STA to the third STA.

Each STA that has sensed the transmission of the trigger frame may suspend the countdown operation performed by its backoff counter at the first time point (T1) of FIG. 17.

For example, as the first backoff procedure (BO1) is suspended, the first backoff counter of STA1 may maintain 6 slots, which remain in the first backoff counter at the transmission point (T1) of the trigger frame.

As the second backoff procedure (BO2) is suspended, the second backoff counter of STA2 may maintain 22 slots, which remain in the second backoff counter at the transmission point (T1) of the trigger frame.

As the third backoff procedure (BO3) is suspended, the third backoff counter of STA3 may maintain 21 slots, which remain in the third backoff counter at the transmission point (T1) of the trigger frame.

A duration (T1~T6), which is indicated by the trigger frame, refers to a time section starting from the transmission point (T1) of the trigger frame to a time point allowing each STA to receive the ACK frames corresponding to each trigger-based frame.

For example, the 6 slots of the first backoff counter of STA1 may be maintained during the duration (T1~T6), which is indicated by the trigger frame. The 22 slots of the second backoff counter of STA2 may be maintained during the duration (T1~T6), which is indicated by the trigger frame. The 21 slots of the third backoff counter of STA3 may be maintained during the duration (T1~T6), which is indicated by the trigger frame.

The duration, which is indicated by the trigger frame, may also be referred to as transmission opportunity (TXOP) section, and in the case shown in FIG. 17, this may refer to a section (or duration) starting from the first time point (T1) to the sixth time point (T6). However, the duration, which is indicated by the trigger frame, will not be limited only to this. And, therefore, it shall be understood that this may also refer to a section (or duration) starting from the first time point (T1) to the seventh time point (T7).

The backoff procedures (BO1~BO3), which are performed before the transmission point (T1) of the trigger frame shown in FIG. 17, may correspond to procedures that are independent to the uplink (UL) transmission operation performed in accordance with the reception of the trigger frame.

More specifically, the backoff procedure being performed by each STA may correspond to a procedure not for passively waiting for the reception of the trigger frame but for actively accessing a channel so as to transmit a data frame, which is currently possessed by the corresponding STA, to the AP, or to transmit a buffer status report (BSR) frame for notifying (or indicating) a buffer status of each STA to the AP.

Subsequently, the AP and the first to third STAs (STA1~STA3) may be on standby during a second section (T2~T3) starting from a time point (T2) at which the transmission of the trigger frame (TF) is completed. For example, the second section (T2~T3) may correspond to a short inter-frame space (SIFS).

Thereafter, the first to third STAs (STA1~STA3) may transmit first to third uplink frames (UL D1~UL D3) to the AP during a third section (T3~T4).

For example, the first to third uplink frames (UL D1~UL D3) may correspond to trigger-based frames being individually transmitted to the AP by each STA as a response to the trigger frame (TF).

In other words, the first to third uplink frames (UL D1~UL D3) of FIG. 17 may correspond to frames being transmitted through radio resources, which are individually set up by the AP, during an overlapping time section by the AP.

More specifically, the first to third uplink frames (UL D1~UL D3) may correspond to trigger-based PPDUs including at least one MAC protocol data unit (MPDU).

Subsequently, the AP and the first to third STAs (STA1~STA3) may be on standby during a fourth section (T4~T5) starting from a time point (T4) at which the transmission of the trigger frame (TF) is completed. For example, the fourth section (T4~T5) may correspond to a short inter-frame space (SIFS).

Thereafter, during a fifth section (T5~T6), each STA may be on standby for the reception of an ACK frame, through which the first to third uplink frames (UL D1~UL D3) notify the successful reception. In FIG. 17, the ACK frame is illustrated as a BA frame, and this corresponds to a frame for notifying the successful reception of at least one MPDU being included in the trigger-based PPDU.

For example, as shown in the above-described ACK frame (M-BA) of FIG. 16, although it is shown that the AP generates one ACK frame (BA) for the plurality of uplink frames (UL D1~UL D3) of FIG. 17, it should be understood that the present invention will not be limited only to this. More specifically, it should be understood that the AP may generate a plurality of ACK frames (BA1~BAn) corresponding to each of the plurality of uplink frames (UL D1~UL D3), as shown in FIG. 15.

Referring to FIG. 17, it is illustrated that the ACK frame (BA) is not received by the first to third STAs (STA1~STA3) of FIG. 17 from the AP. Diverse causes may exist for the case where the ACK frame (BA) is not received from the AP.

For example, there may exist a case where the AP actually fails to receive the ACK frame (BA) due to a channel status according to the surrounding environment or a case where a collision occurs between the STAs. As another example, there may also exist a case where the ACK frames fails to be received due to an inadequate setting (or configuration) of a transmission (TX) power or modulation coding scheme (MCS) value in the AP or the STA.

Subsequently, each STA may determine whether or not the channel status is idle during a sixth section (T6~T7). For example, the sixth section (T6~T7) may correspond to an arbitration inter-frame space (AIFS), a DCF inter-frame space (DIFS), an extended inter-frame space (EIFS), a PCF inter-frame space (PIFS), a reduced inter-frame space (RIFS), or a short inter-frame space (SIFS).

Thereafter, if it is determined that the channel status is idle during the sixth section (T6~T7), each STA may resume its backoff count, which was suspended at the first time point (T1).

The backoff operation, which is mentioned in FIG. 17, may be referred to as a resumed backoff.

For example, the first backoff counter of STA1 may resume the countdown of the 6 slots remaining in the first backoff counter. The second backoff counter of STA2 may resume the countdown of the 22 slots remaining in the second backoff counter. The third backoff counter of STA3 may resume the countdown of the 21 slots remaining in the third backoff counter.

The STA, which corresponds to the first STA to have completed its countdown, may attempt to re-transmit the uplink frame for which the ACK frame has not been received since the seventh time point (T7). In case the frame, which the STA had intended to transmit through the channel access before the first time point (T1), is different from the frame that is requested by the trigger frame, the STA, which corresponds to the first STA to have completed its countdown, may transmit the frame, which it had intended to transmit through a channel access before the first time point, after the seventh time point (T7).

Although FIG. 17 describes the first to third STAs, it should be understood that this specification will not be limited only to this.

Figure 18:
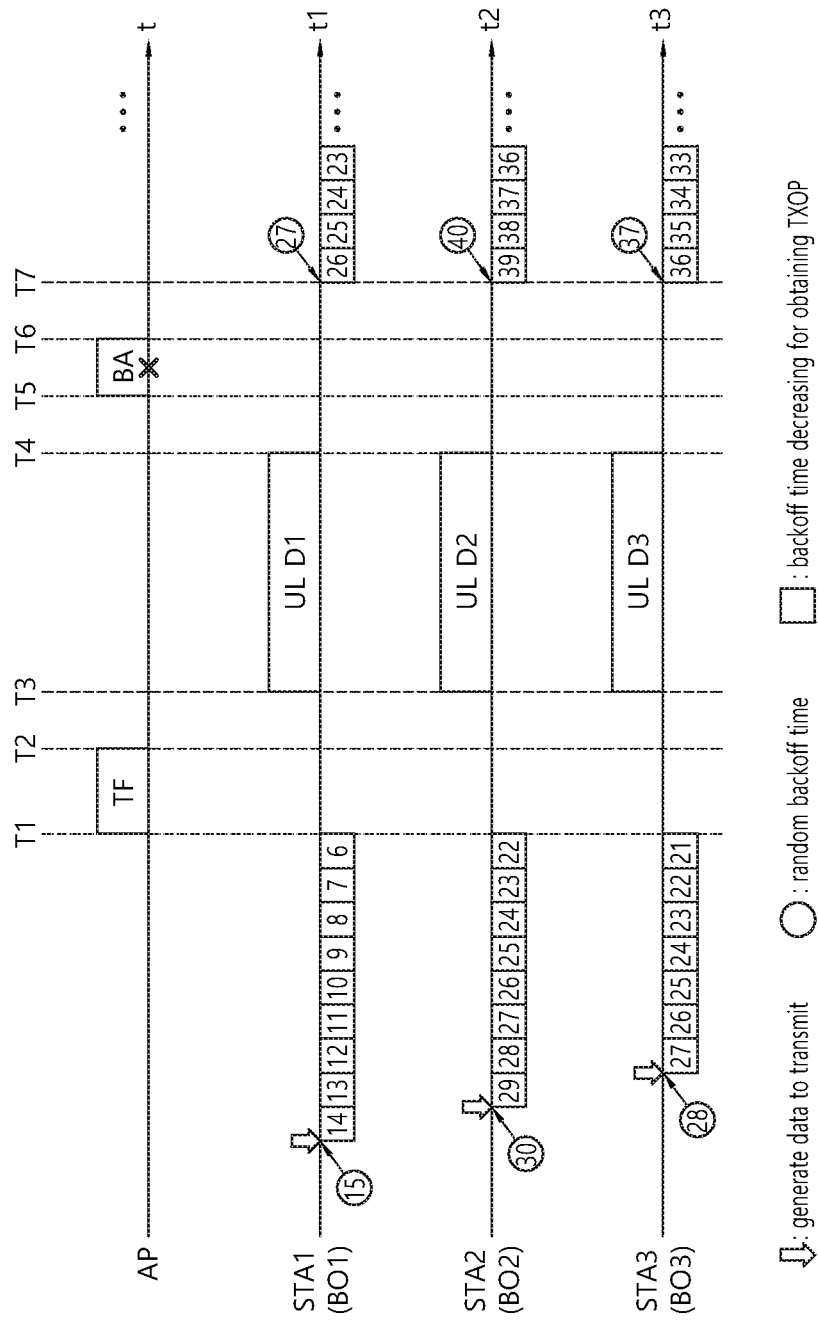
FIG. 18 is a diagram showing an EDCA backoff operation in case an ACK frame fails to be received according to another exemplary embodiment of this specification.

FIG. 18 is a diagram showing an EDCA backoff operation in case an ACK frame fails to be received according to another exemplary embodiment of this specification.

Referring to FIG. 17 and FIG. 18, it should be understood that the description on the process of setting up (or configuring) the random backoff time (RBT) before the first time point (T1) of FIG. 18 in STA1 to STA3 and the description on the first section (T1~T2) to the sixth section (T6~T7) may be replaced with the description presented above with reference to FIG. 17.

Referring to FIG. 18, after the seventh time point (T7) of FIG. 18, each STA of FIG. 18 re-configures the random backoff time (RBT) of its backoff counter.

For example, as shown in FIG. 17, in case the data reaching the MAC layer of STA1 correspond to the AC_VI type, according to Table 2, which is presented above, CWmin[AC_VI] may be equal to '15', and CWmax [AC_VI] may be equal to '31'. In accordance with the above-mentioned assumption, CWmin[AC_VI] may be set up in the contention window (CW[i]).

The STA1 may set the contention window (CW[i]) before the first time point (T1) to CWold[i] of Equation 2 and may calculate a new contention window (CWnew[i]). As a result of Equation 2, the new contention window (CWnew[i]) is set to '31'.

Accordingly, in order to perform the first backoff process (BO1) after the seventh time point (T7), the random function (Random(i)) of STA1 may randomly select an integer value within a range starting from '0' to '31'.

For example, STA1 of FIG. 18 corresponds to a case where the random value is set to '27'. And, in this case, the random backoff time (RBT) of STA1 is equal to 27 slots.

The STA2 may set the contention window (CW[i]) before the first time point (T1) to CWold[i] of Equation 2 and may calculate a new contention window (CWnew[i]). As a result of Equation 2, the new contention window (CWnew[i]) is set to '63'.

Accordingly, in order to perform the second backoff process (BO2) after the seventh time point (T7), the random function (Random(i)) of STA2 may randomly select an integer value within a range starting from '0' to '63'.

For example, STA2 of FIG. 18 corresponds to a case where the random value is set to '40'. And, in this case, the random backoff time (RBT) of ST2 is equal to 40 slots.

The STA3 may set the contention window (CW[i]) before the first time point (T1) to CWold[i] of Equation 2 and may calculate a new contention window (CWnew[i]). As a result of Equation 2, the new contention window (CWnew[i]) is set to '63'.

Accordingly, in order to perform the third backoff process (BO3) after the seventh time point (T7), the random function (Random(i)) of STA3 may randomly select an integer value within a range starting from '0' to '63'.

For example, STA3 of FIG. 18 corresponds to a case where the random value is set to '37'. And, in this case, the random backoff time (RBT) of STA3 is equal to 37 slots.

More specifically, since the size of the contention window (CW[i]) of the backoff operation, which is mentioned in FIG. 18, increases exponentially, in this specification, such backoff operation may be referred to as exponential backoff.

FIG. 17 and FIG. 18 describe a case when an ACK frame corresponding to the uplink frame fails to be received. The case where each STA has received the trigger frame (TF) may indicate that the channel is idle.

More specifically, this may be understood as a case where the TXOP duration is protected from the AP by a network allocation vector (NAV). Therefore, this may indicate that the cause of the failure to receive the ACK frame from the AP by each STA is very unlikely to be due to a transmission failure resulting from an overlapping basic service set (OBSS) or a transmission failure resulting from a collision.

In other words, the cause of the failure to receive the ACK frame shall be relatively more likely to be due to an internal problem of the STA, such as MCS value settings.

Therefore, instead of unconditionally (or without any doubt) regarding the situation of failing to receive the ACK frame as a transmission failure and performing an exponential backoff, as shown in FIG. 18, it may be more reasonable to perform a resumed backoff, as shown in FIG. 17. Performing the resumed backoff may enhance the overall performance of the wireless LAN system.

Figure 19:
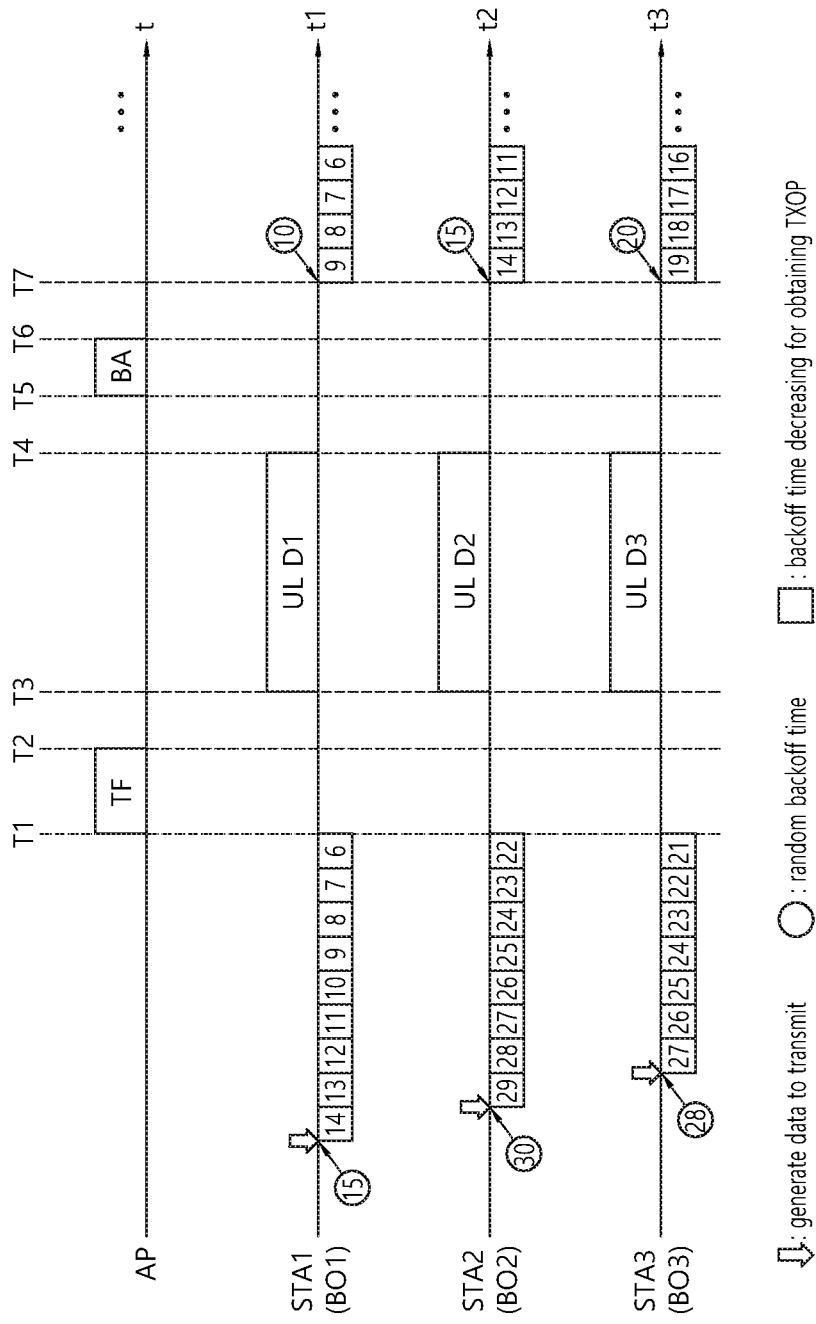
FIG. 19 is a diagram showing an EDCA backoff operation in case an ACK frame is received according to an exemplary embodiment of this specification.

FIG. 19 is a diagram showing an EDCA backoff operation in case an ACK frame is received according to an exemplary embodiment of this specification.

Referring to FIG. 17 and FIG. 19, it should be understood that the description on the process of setting up (or configuring) the random backoff time (RBT) before the first time point (T1) of FIG. 19 in STA1 to STA3 and the description on the first section (T1~T2) to the sixth section (T6~T7) may be replaced with the description presented above with reference to FIG. 17.

Referring to FIG. 19, in the fifth section (T5~T6), each STA (STA1, STA2, STA3) may receive an ACK frame from the AP. In FIG. 19, the ACK frame is illustrated as a BA frame, and a detailed description of the same has been presented above in FIG. 17.

Referring to FIG. 19, after the seventh time point (T7) of FIG. 19, the random backoff time (RBT) of the backoff counter is re-configured.

For example, as shown in FIG. 17, in case the data reaching the MAC layer of STA1 correspond to the AC_VI type, according to Table 2, which is presented above, CWmin[AC_VI] may be equal to '15', and CWmax [AC_VI] may be equal to '31'. In accordance with the above-mentioned assumption, CWmin[AC_VI] may be set up in the contention window (CW[i]).

After the seventh time point (T7), in order to perform a first backoff procedure (BO1), the random function (Random(i)) of STA1 may randomly select an integer value within a range starting from '0' to '15'. For example, STA1 of FIG. 19 corresponds to a case where the random value is set to '10'. And, in this case, the random backoff time (RBT) of STA1 is equal to 10 slots. Subsequently, STA1 may perform countdown of the random backoff time (RBT).

For example, as shown in FIG. 17, in case the data reaching the MAC layer of STA2 correspond to the AC_BE type, according to Table 2, which is presented above, CWmin[AC_BE] may be equal to '31', and CWmax [AC_BE] may be equal to '1023'. In accordance with the above-mentioned assumption, CWmin[AC_BE] may be set up in the contention window (CW[i]).

After the seventh time point (T7), in order to perform a second backoff procedure (BO2), the random function (Random(i)) of STA2 may randomly select an integer value within a range starting from '0' to '31'. For example, STA2 of FIG. 19 corresponds to a case where the random value is set to '15'. And, in this case, the random backoff time (RBT) of STA2 is equal to 15 slots. Subsequently, STA2 may perform countdown of the random backoff time (RBT).

For example, as shown in FIG. 17, in case the data reaching the MAC layer of STA3 correspond to the AC_BK type, according to Table 2, which is presented above, CWmin[AC_BK] may be equal to '31', and CWmax [AC_BK] may be equal to '1023'. In accordance with the above-mentioned assumption, CWmin[AC_BK] may be set up in the contention window (CW[i]).

After the seventh time point (T7), in order to perform a third backoff procedure (BO3), the random function (Random(i)) of STA3 may randomly select an integer value within a range starting from '0' to '31'. For example, STA3 of FIG. 19 corresponds to a case where the random value is set to '20'. And, in this case, the random backoff time (RBT) of STA3 is equal to 20 slots. Subsequently, STA3 may perform countdown of the random backoff time (RBT).

Figure 20:
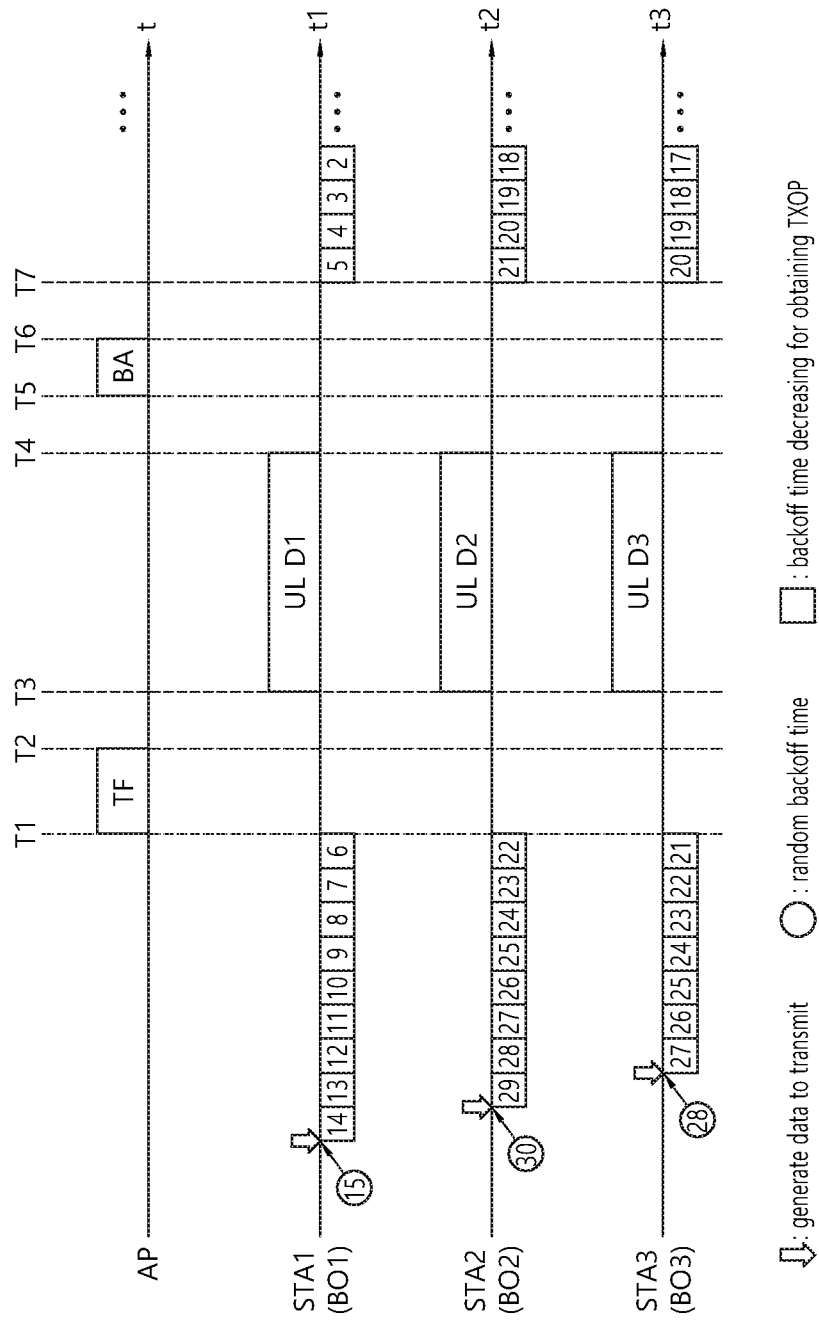
FIG. 20 is a diagram showing an EDCA backoff operation in case an ACK frame is received according to another exemplary embodiment of this specification.

FIG. 20 is a diagram showing an EDCA backoff operation in case an ACK frame is received according to another exemplary embodiment of this specification.

Referring to FIG. 17 to FIG. 20, it should be understood that the description on the first section (T1~T2) to the sixth section (T6~T7) may be replaced with the description presented above with reference to FIG. 17.

Referring to FIG. 20, after the seventh time point (T7) at which each STA receives an ACK frame, each STA may resume the backoff count, which was suspended at the first time point (T1).

The backoff operation, which is mentioned in FIG. 20, may be referred to as a resumed backoff.

For example, the first backoff counter of STA1 may resume the countdown of the 6 slots remaining in the first backoff counter. The second backoff counter of STA2 may resume the countdown of the 22 slots remaining in the second backoff counter. The third backoff counter of STA3 may resume the countdown of the 21 slots remaining in the third backoff counter.

The STA, which corresponds to the first STA to have completed its countdown, may transmit an uplink frame after the seventh time point (T7).

Although FIG. 20 describes the first to third STAs, it should be understood that this specification will not be limited only to this.

Figure 21:
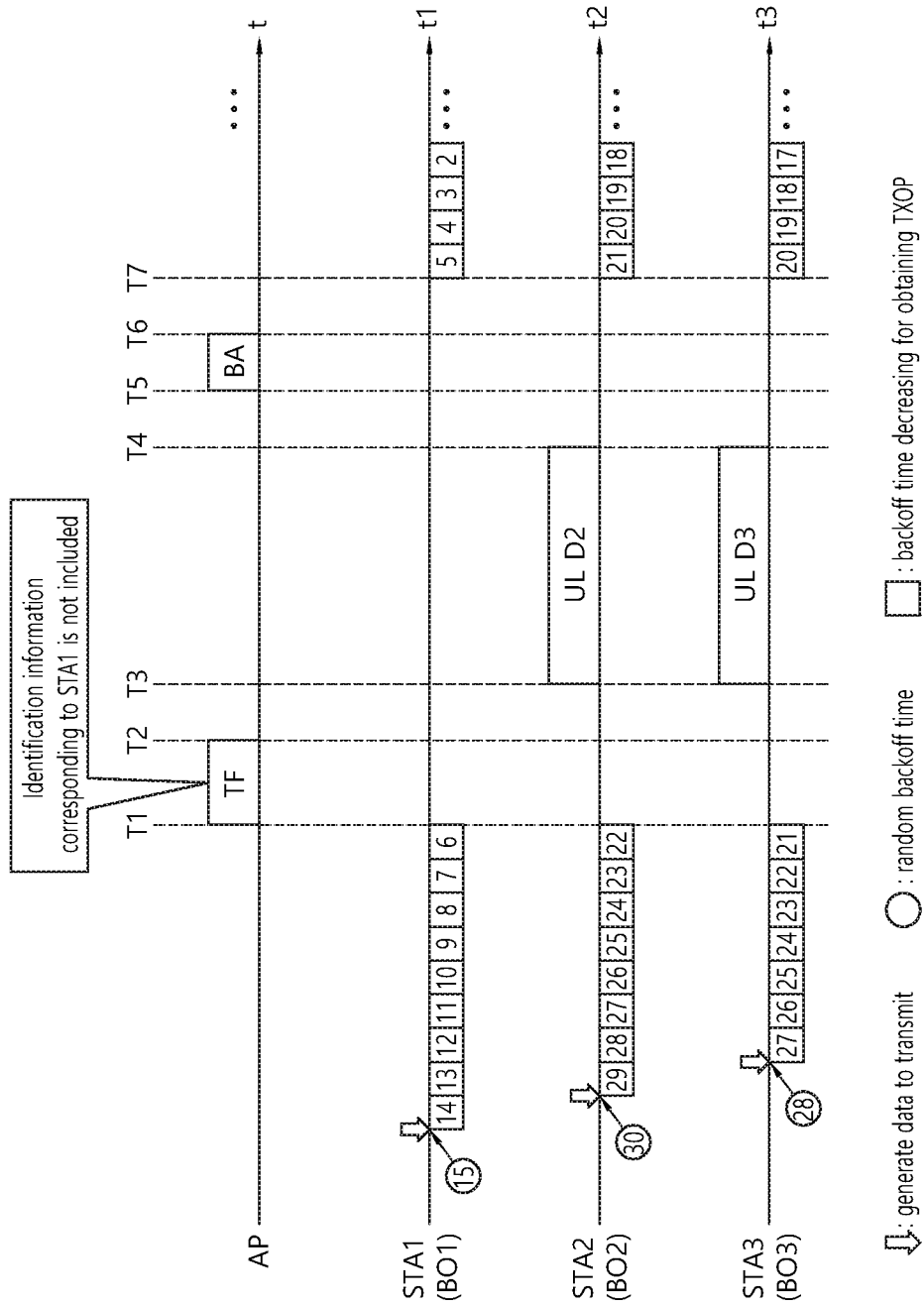
FIG. 21 is a diagram showing an EDCA backoff operation according to an exemplary embodiment of this specification.

FIG. 21 is a diagram showing an EDCA backoff operation according to an exemplary embodiment of this specification.

Referring to FIG. 17 and FIG. 21, it should be understood that the description on the process of setting up (or configuring) the random backoff time (RBT) before the first time point (T1) of FIG. 21 in STA1 to STA3 may be replaced with the description presented above with reference to FIG. 17.

Referring to FIG. 21, the trigger frame being transmitted during the first section (T1~T2) may not include identification information on STA1. For example, the trigger frame may not include an association identifier (AID) of STA1 but may only include the AID of STA2 and the AID of STA3.

The second section (T2~T3) may correspond to an SIFS, and a detailed description of the same has been presented above. Subsequently, the second and third STAs (STA2, STA3) may transmit second and third uplink frames (UL D2, UL D3) to the AP during the third section (T3~T4).

For example, the second and third uplink frames (UL D2, UL D3) may correspond to trigger-based frames being individually transmitted to the AP by each STA as a response to the trigger frame (TF).

In other words, the second and third uplink frames (UL D2, UL D3) of FIG. 21 may correspond to frames being transmitted through radio resources, which are individually set up by the AP, during an overlapping time section by the AP.

Subsequently, the AP and the first to third STAs (STA1~STA3) may be on standby during a fourth section (T4~T5) starting from a time point (T4) at which the transmission of the second and third uplink frames (UL D2, UL D3) is completed. For example, the fourth section (T4~T5) may correspond to a short inter-frame space (SIFS).

During a fifth section (T5~T6), each STA may be on standby for the reception of an ACK frame, through which the second and third uplink frames (UL D2, UL D3) notify the successful reception. In FIG. 17, the ACK frame is illustrated as a BA frame, and this corresponds to a frame for notifying the successful reception of at least one MPDU being included in the trigger-based PPDU.

Subsequently, each STA may determine whether or not the channel status is idle during a sixth section (T6~T7). For example, the sixth section (T6~T7) may correspond to an arbitration inter-frame space (AIFS), a DCF inter-frame space (DIFS), an extended inter-frame space (EIFS), a PCF inter-frame space (PIFS), a reduced inter-frame space (RIFS), or a short inter-frame space (SIFS).

Thereafter, if it is determined that the channel status is idle during the sixth section (T6~T7), each STA may resume its backoff count, which was suspended at the first time point (T1).

The backoff operation, which is mentioned in FIG. 21, may be referred to as a resumed backoff.

Figure 22:
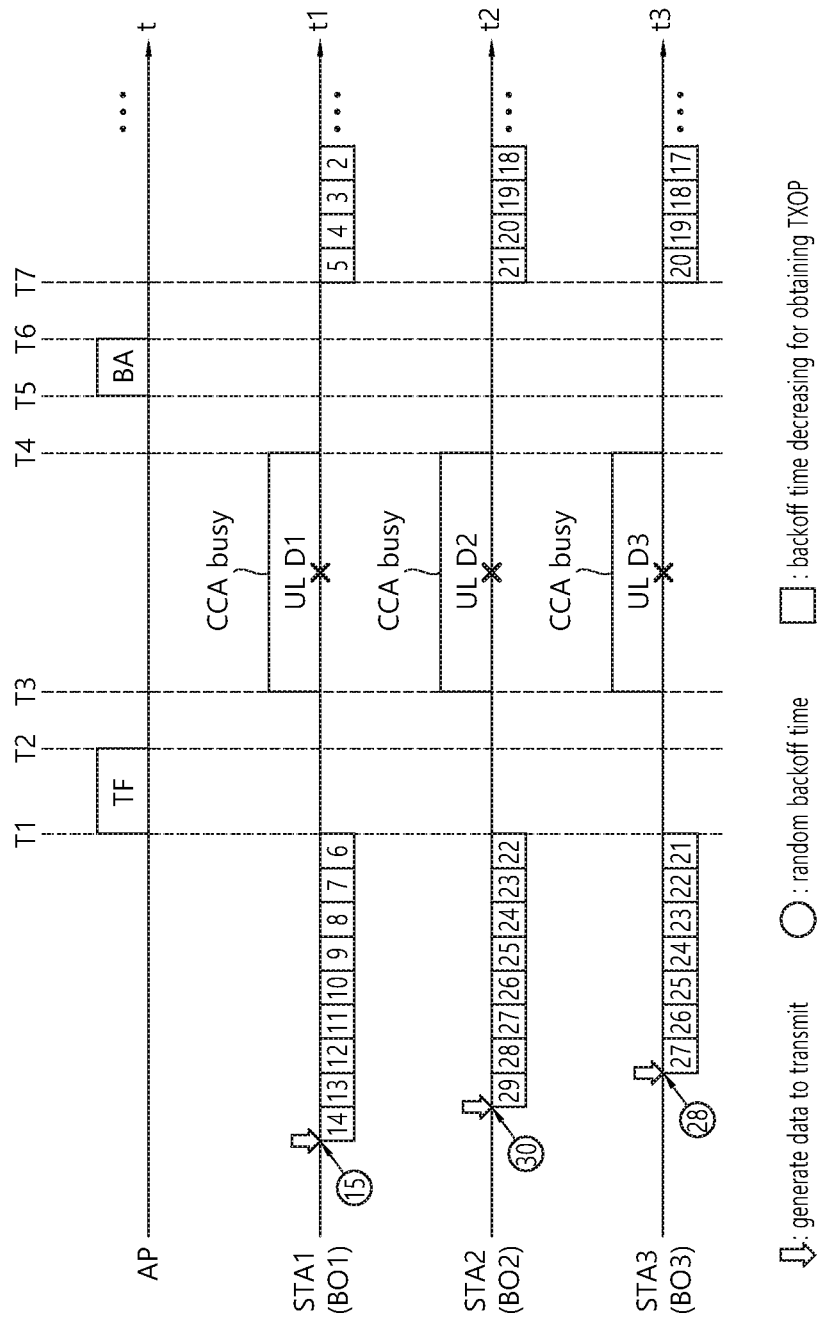
FIG. 22 is a diagram showing an EDCA backoff operation according to another exemplary embodiment of this specification.

FIG. 22 is a diagram showing an EDCA backoff operation according to another exemplary embodiment of this specification.

Referring to FIG. 17 and FIG. 22, it should be understood that the description on the process of setting up (or configuring) the random backoff time (RBT) before the first time point (T1) of FIG. 22 in STA1 to STA3 and the description on the first section (T1~T2) and the second section (T2~T3) may be replaced with the description presented above with reference to FIG. 17.

Thereafter, in the third section (T3~T4), since the channel status according to a clear channel assessment (CCA) is busy, the first to third STAs (STA1~STA3) may not be capable of transmitting the first to third uplink frames (UL D1~UL D3) to the AP.

Subsequently, the AP and the first to third STAs (STA1~STA3) may be on standby during a fourth section (T4~T5) after the transmission failure of the first to third uplink frames (UL D1~UL D3). For example, the fourth section (T4~T5) may correspond to a short inter-frame space (SIFS).

In the fifth section (T5~T6), since there are no uplink frames being transmitted by each STA, the AP does not generate any ACK frames.

Subsequently, each STA may determine whether or not the channel status is idle during a sixth section (T6~T7). For example, the sixth section (T6~T7) may correspond to an arbitration inter-frame space (AIFS), a DCF inter-frame space (DIFS), an extended inter-frame space (EIFS), a PCF inter-frame space (PIFS), a reduced inter-frame space (RIFS), or a short inter-frame space (SIFS).

Thereafter, if it is determined that the channel status is idle during the sixth section (T6~T7), each STA may resume its backoff count, which was suspended at the first time point (T1).

The backoff operation, which is mentioned in FIG. 22, may be referred to as a resumed backoff.

Figure 23:
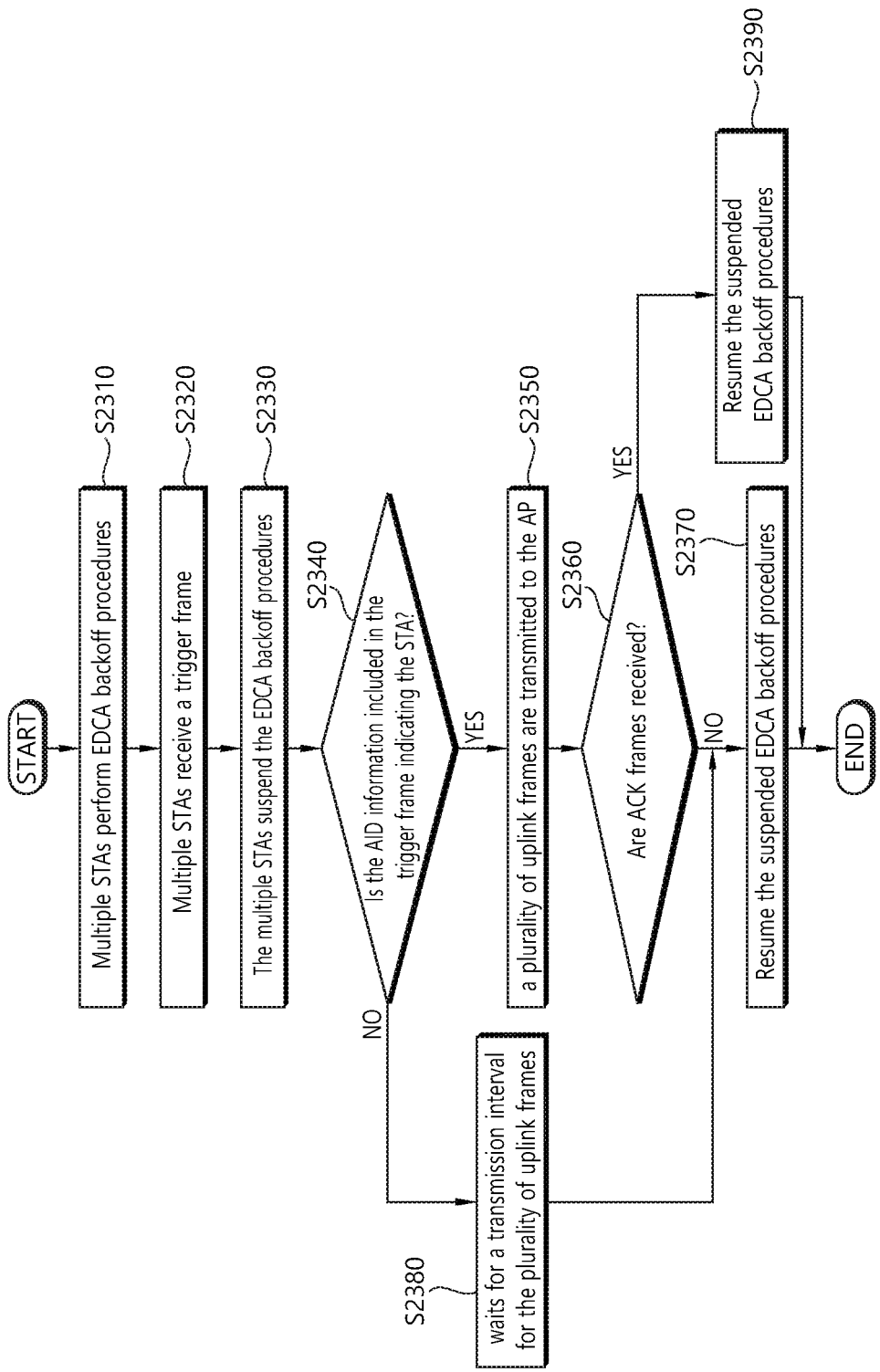
FIG. 23 is flow chart for describing an EDCA operation according to this specification.

FIG. 23 is flow chart for describing an EDCA operation according to this specification.

Referring to FIG. 12 to FIG. 23, in step S2310, a plurality of STAs may perform countdown operation of an EDCA backoff counter.

In step S2320, the plurality of STAs may receive a trigger frame.

In step S2330, the plurality of STAs having received the trigger frame may suspend the countdown operation of the EDCA backoff counter.

In step S2340, each STA that has received the trigger frame may determine whether or not its identification information is included in the trigger frame. If the identification information of the corresponding STA is not included in the respective trigger frame, the operation proceeds to step S2380.

If the identification information of the corresponding STA is included, in step S2350, at least two STAs being indicated by the trigger frame may transmit at least two trigger-based frames to the AP as a response to the trigger frame.

In step S2360, each STA that has transmitted the trigger-based uplink frame may determine whether or not an ACK frame corresponding to the trigger-based uplink frame is received from the AP. IF the ACK frame corresponding to the trigger-based uplink frame is received, the operation proceeds to step S2390.

In step S2370, the STA that fails to receive the ACK frame corresponding to the uplink frame may resume the countdown operation of the EDCA backoff counter, which was suspended in step S2330.

In step S2380, the STA that does not have its identification information included in the trigger frame may be on standby during a section indicated by the trigger frame.

In step S2390, the STA that has received the ACK frame corresponding to the uplink frame may resume the countdown operation of the EDCA backoff counter, which was suspended in step S2330.

It should be understood that the examples described above with reference to FIG. 17 to FIG. 23 are described under the premise that each STA performs contention-based channel access (e.g., EDCA) in order to transmit the uplink frame.

In case the contention-based channel access is not configured (or set up) in the association step between the AP and the STA, each STA remains on standby until the trigger frame including the scheduling information is received from the AP. In case the STA that has transmitted the uplink frame fails to receive the ACK frame, the STA re-transmits the uplink frame.

Even if the contention-based channel access is not set up in the STA, the STA may transmit a BSR frame as a response to a BSRP type trigger frame being transmitted by the AP.

Subsequently, the AP may transmit to each STA the trigger frame including the scheduling information, which is determined based on the BSR frame being received from each STA. The STA may perform once again the uplink transmission based on the scheduling information for the uplink transmission of the trigger frame.

Figure 24:
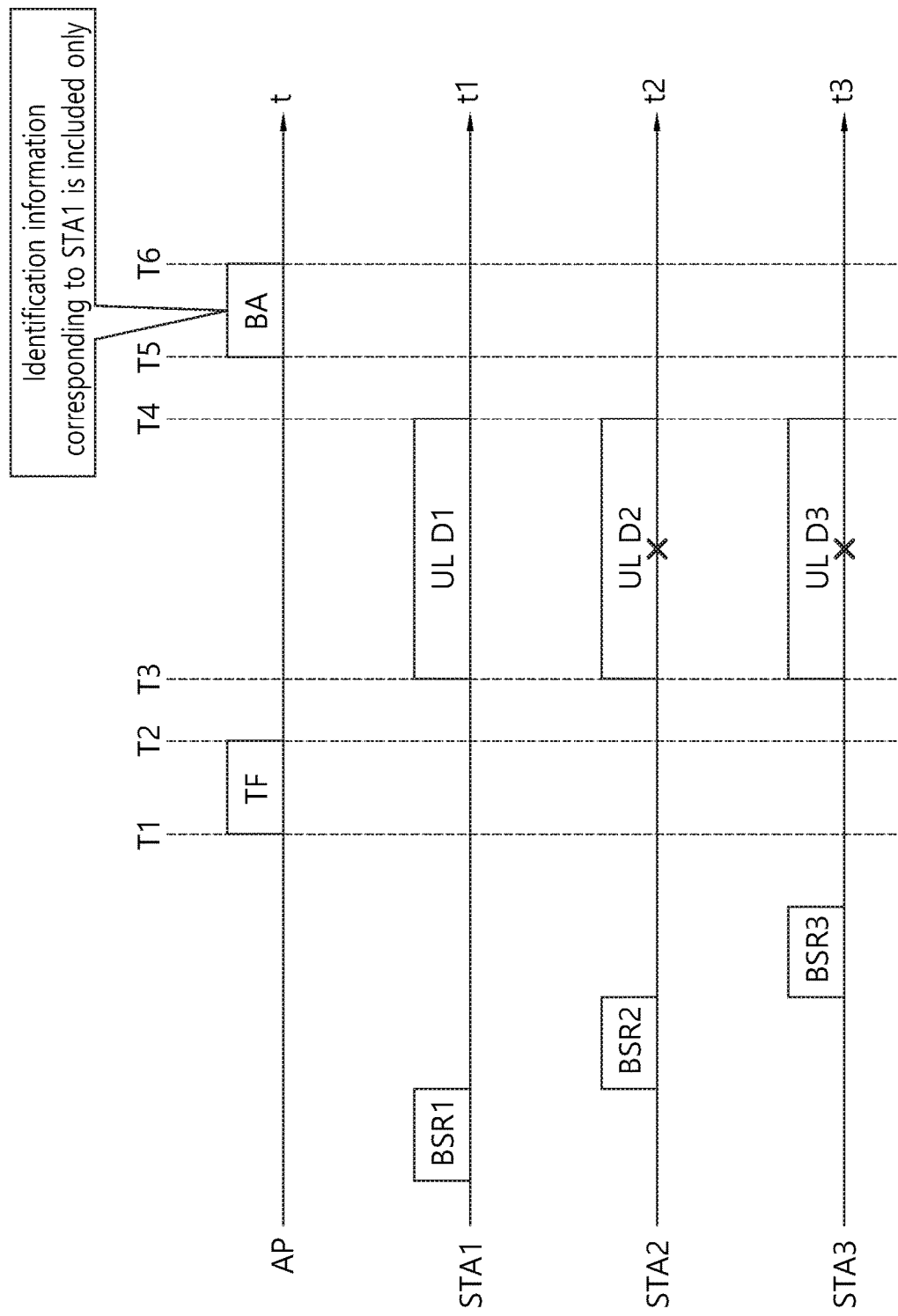
FIG. 24 is a diagram for describing an exemplary case wherein an uplink frame corresponding to a trigger frame fails to be received according to an exemplary embodiment of this specification.

FIG. 24 is a diagram for describing an exemplary case wherein an uplink frame corresponding to a trigger frame fails to be received according to an exemplary embodiment of this specification.

Referring to FIG. 24, each STA (STA1, STA2, STA3) of FIG. 24 may transmit a buffer status report (hereinafter referred to as BSR) frame (BSR1~BSR3), which is associated with the traffic data of each STA, to the AP. The information included in the buffer status report (BSR) frame (BSR1~BSR3), which is transmitted by each STA, may be stored in a virtual buffer.

The information of the buffer status report frame (BSR1~BSR3) may be stored in the virtual buffer of the AP until the ACK frame on the traffic data of the STA corresponding to the buffer status report frame (BSR1~BSR3) is transmitted.

In the first section (T1~T2), the AP may transmit a trigger frame (TF) including scheduling information for the uplink transmission to each STA based on the buffer status report frame (BSR1~BSR3).

For example, the trigger frame (TF) of FIG. 24 may correspond to a frame requesting the transmission of first to third uplink frames (UL D1~UL D3) from each STA (STA1, STA2, STA3) during an overlapping time section through radio resource, which are individually configured.

In the second section (T2~T3), the AP and the first to third STAs (STA1~STA3) may be on standby. For example, the second section (T2~T3) may correspond to a short inter-frame space (SIFS).

In the third section (T3~T4), the AP may receive the first uplink frame (UL D1), which is received from STA1, as a response to the trigger frame (TF). However, the AP may not receive second and third uplink frames (UL D2, UL D3).

After the AP has transmitted the trigger frame (TF), a case where the uplink frame corresponding to the trigger frame fails to be received may be as described below.

For example, the uplink frame corresponding to the trigger frame may not be received, in case the reception failure results from a collision caused by the plurality of STAs, in case the AP is incapable of receiving the uplink frame because the clear channel assessment (CCA) of the plurality of STAs is in a busy state, or in case the STA is incapable of receiving the trigger frame (TF).

In the fourth section (T4~T5), the AP and the first to third STAs (STA1~STA3) may be on standby. For example, the fourth section (T4~T5) may correspond to a short inter-frame space (SIFS).

In the fifth section (T5~T6), an ACK frame (BA) notifying the successful reception of the first uplink frame (UL D1) is received.

The information being included in the second and third buffer status report frames (BSR2, BSR3) corresponding to the second and third uplink frames (UL D2, UL D3) may be maintained in the AP for the transmission of a trigger frame (not shown) after the sixth time point (T6).

Figure 25:
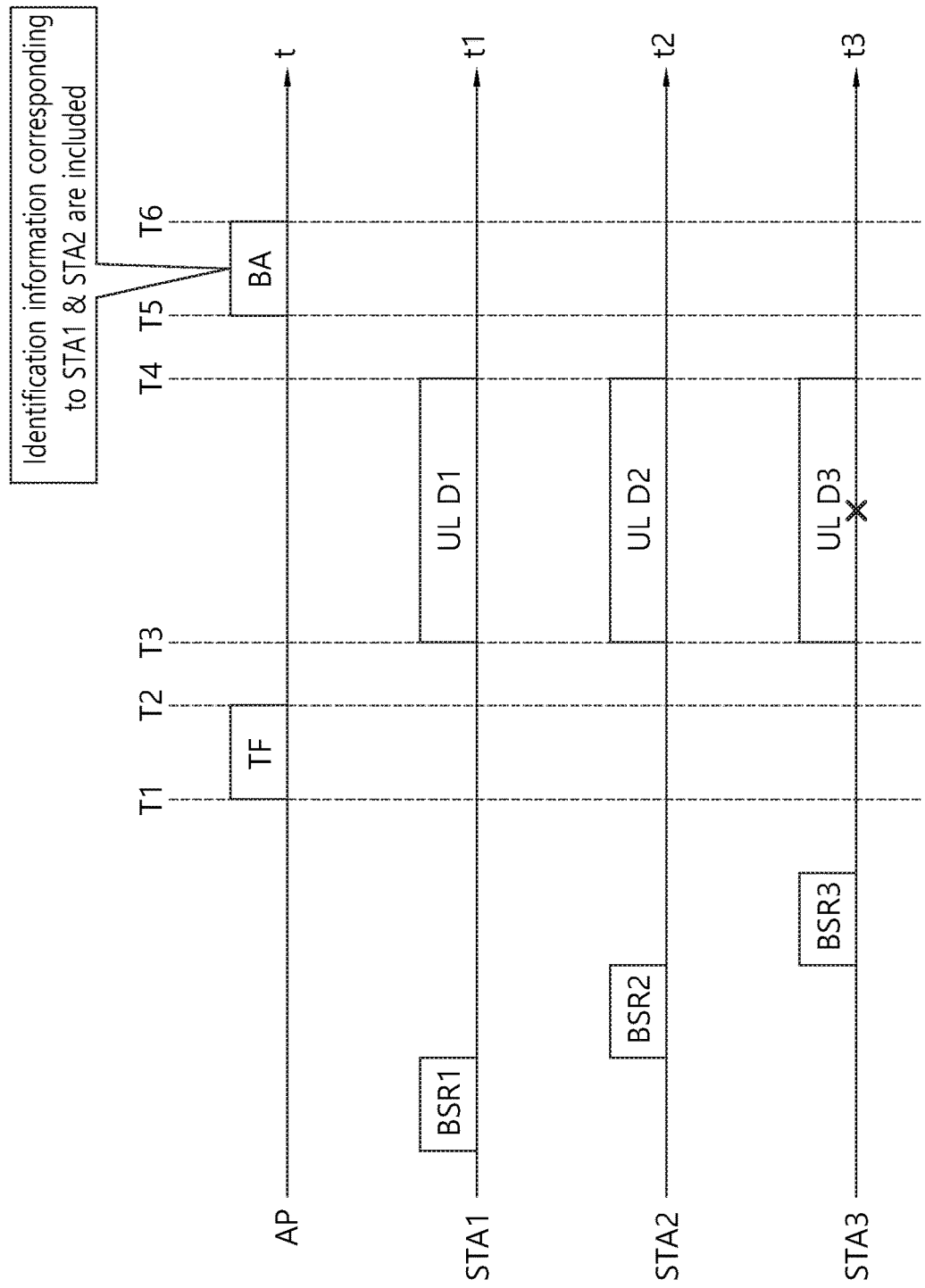
FIG. 25 is a diagram for describing an exemplary case wherein an uplink frame corresponding to a trigger frame fails to be received according to another exemplary embodiment of this specification.

FIG. 25 is a diagram for describing an exemplary case wherein an uplink frame corresponding to a trigger frame fails to be received according to another exemplary embodiment of this specification.

Referring to FIG. 23 and FIG. 25, it should be understood that the description on the first section (T1~T2) and the second section (T2~T3) of FIG. 25 may be replaced with the description presented above with reference to FIG. 24.

In the third section (T3~T4), the AP may receive the first and second uplink frames (UL D1, UL D2), which are received from STA1 and STA2, as a response to the trigger frame (TF). However, the AP may not receive the third uplink frame (UL D3).

In the fourth section (T4~T5), the AP and the first to third STAs (STA1~STA3) may be on standby. For example, the fourth section (T4~T5) may correspond to a short interframe space (SIFS).

In the fifth section (T5~T6), an ACK frame (BA) notifying the successful reception of the first and second uplink frames (UL D1, UL D2) is received.

The information being included in the third buffer status report frame (BSR3) corresponding to the third uplink frame (UL D3) may be maintained in the AP for the transmission of a trigger frame (not shown) after the sixth time point (T6).

FIG. 26 is a diagram for describing operations of an AP in case the uplink frame corresponding to the trigger frame fails to be received according to FIG. 24 and FIG. 25.

In step S2610, the AP may determine whether or not 2 or more BSR frames are received from the plurality STAs. In case less than 2 BSR frames is received, the operation is ended.

The trigger frame corresponds to a frame requesting for the transmission of an uplink frame from the plurality of STAs. Considering the characteristics of the trigger frame, in case the AP has received only one BSR frame from one STA, the trigger frame may not be generated.

In step S2620, in case the AP has received 2 or more BSR frames, the AP may transmit the trigger frame, which is generated based on the BSR frames, to the plurality of STAs.

Since the AP, which is described above in FIG. 24 and FIG. 25, corresponds to a case where first to third BSR frames (BSR1~BSR3) are received from the first to third STAs (STA1~STA3), step S2610 and step S2620 are performed.

In step S2630, as a result of the uplink frame, which corresponds to the trigger frame (TF), failing to be received, it may be determined whether or not the AP maintains 2 or more sets of information being included in the BSR frame.

In step S2640, the AP may receive the BSR frame until the information included in 2 or more BSR frames are maintained by the AP.

In step S2650, based on the information included in the BSR frame, which is maintained by the AP, the AP may generate a next trigger frame (not shown). In the example shown in FIG. 24, the next trigger frame (not shown) may be generated based on the information included in the second and third buffer status report frames (BSR2, BSR3) corresponding to the second and third uplink frames (UL D2, UL D3). In the above-described case corresponding to FIG. 24, the operation proceeds from step S2530 to step S2550. In case of FIG. 25, the operation proceeds from step S2530 to step S2540 and then to step S2550.

Figure 27:
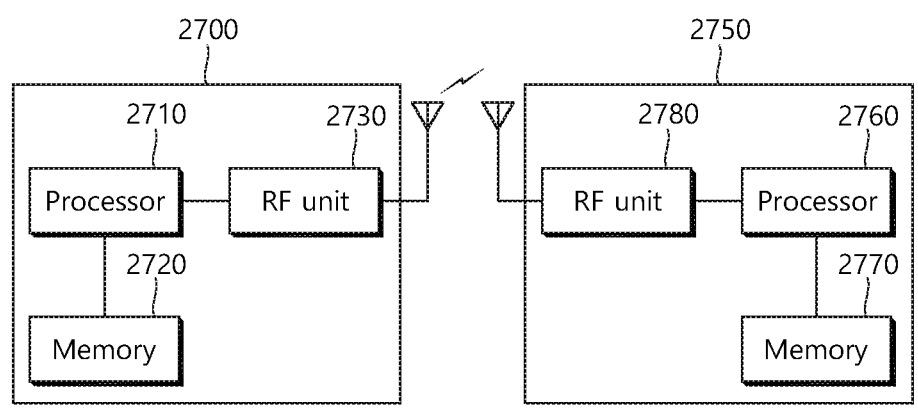
FIG. 27 is a block view illustrating a wireless device to which the exemplary embodiment of the present invention can be applied.

FIG. 27 is a block view illustrating a wireless device to which the exemplary embodiment of the present invention can be applied.

Referring to FIG. 27, as an STA that can implement the above-described exemplary embodiment, the wireless device may correspond to an AP or a non-AP station (STA). The wireless device may correspond to the above-described user or may correspond to a transmitting device transmitting a signal to the user.

The AP 2700 includes a processor 2710, a memory 2720, and a radio frequency (RF) unit 2730.

The RF unit 2730 is connected to the processor 2710, thereby being capable of transmitting and/or receiving radio signals.

The processor 2710 implements the functions, processes, and/or methods proposed in the present invention. For example, the processor 2710 may be implemented to perform the operations according to the above-described exemplary embodiments of the present invention. More specifically, among the operations that are disclosed in the exemplary embodiments of FIG. 1 to FIG. 26, the processor 2710 may perform the operations that may be performed by the AP.

The non-AP STA 2750 includes a processor 2760, a memory 2770, and a radio frequency (RF) unit 2780.

The RF unit 2780 is connected to the processor 2760, thereby being capable of transmitting and/or receiving radio signals.

The processor 2760 implements the functions, processes, and/or methods proposed in the present invention. For example, the processor 2760 may be implemented to perform the operations of the non-AP STA according to the above-described exemplary embodiments of the present invention. The processor may perform the operations of the non-AP STA, which are disclosed in the exemplary embodiments of FIG. 1 to FIG. 26.

The processor 2710 and 2760 may include an application-specific integrated circuit (ASIC), another chip set, a logical circuit, a data processing device, and/or a converter converting a baseband signal and a radio signal to and from one another. The memory 2720 and 2770 may include a read-only memory (ROM), a random access memory (RAM), a flash memory, a memory card, a storage medium, and/or another storage device. The RF unit 2730 and 2780 may include one or more antennas transmitting and/or receiving radio signals.

When the exemplary embodiment is implemented as software, the above-described method may be implemented as a module (process, function, and so on) performing the above-described functions. The module may be stored in the memory 2720 and 2770 and may be executed by the processor 2710 and 2760. The memory 2720 and 2770 may be located inside or outside of the processor 2710 and 2760 and may be connected to the processor 2710 and 2760 through a diversity of well-known means.

Although an embodiment of the invention has been described in detail in the present specification, various modifications are possible without departing from the scope of the present specification. Therefore, the scope of the present specification should not be construed as being limited to the aforementioned embodiment but should be defined by not only claims of the invention described below but also equivalents to the claims.

What is claimed is:

1. A method used in a wireless local area network (WLAN) system, the method comprising:
   performing, by a station (STA), a countdown operation of a backoff counter for an enhanced distributed channel access (EDCA);
   receiving, by the STA, a trigger frame soliciting uplink multi-user (UL MU) transmission in which a plurality of UL frames are transmitted to an access point (AP), wherein the trigger frame includes UL resource information to be used for the UL MU transmission;
suspending, by the STA, the countdown operation until a completion of an uplink UL transmission of a trigger-based frame,
wherein the trigger-based frame is transmitted to the AP during an overlapping time duration as a response to the trigger frame;
determining, by the STA, whether or not an acknowledgement (ACK) frame for the trigger-based frame is received from the AP; and
if the STA fails to receive the ACK frame from the AP, resuming, by the STA, the suspended countdown operation.

2. The method of claim 1, wherein the suspended countdown operation is resumed by the STA after a wireless medium used by the STA is determined to be idle during a duration of an inter-frame space.

3. The method of claim 2, wherein the inter-frame space is at least one of an arbitration inter-frame space (AIFS), a DCF inter-frame space (DIFS), an extended inter-frame space (EIFS), a PCF inter-frame space (PIFS), a reduced inter-frame space (RIFS), or a short inter-frame space (SIFS).

4. The method of claim 1, wherein the trigger frame includes information on a time duration used for the UL MU transmission.

5. The method of claim 1, wherein the countdown operation is performed by reducing a random value in time slot units.

6. The method of claim 1, wherein the trigger frame includes an association identifier (AID) of the STA.

7. A station (STA) in a wireless local area network (WLAN), the STA comprising:
a transceiver transceiving radio signals; and
a processor being operatively connected to the transceiver,
wherein the processor is configured:
to perform a countdown operation of a backoff counter for an enhanced distributed channel access (EDCA),
to receive a trigger frame soliciting uplink multi-user (UL MU) transmission in which a plurality of UL frames are transmitted to an access point (AP),
wherein the trigger frame includes UL resource information to be used for the UL MU transmission,
to suspend the countdown operation until a completion of an UL transmission of a trigger-based frame,
wherein the trigger-based frame is transmitted to the AP during an overlapping time duration as a response to the trigger frame,
to determine whether or not an acknowledgement (ACK) frame for the trigger-based frame is received from the AP, and
to resume the suspended countdown operation, if the STA fails to receive the ACK frame from the AP.

8. The STA of claim 7, wherein the suspended countdown operation is resumed by the STA after a wireless medium used by the STA is determined to be idle during a duration of an inter-frame space.

9. The STA of claim 8, wherein the inter-frame space is at least one of an arbitration inter-frame space (AIFS), a DCF inter-frame space (DIFS), an extended inter-frame space (EIFS), a PCF inter-frame space (PIFS), a reduced inter-frame space (RIFS), or a short inter-frame space (SIFS).

10. The STA of claim 7, wherein the trigger frame includes information on a time duration used for the UL MU transmission.

11. The STA of claim 7, wherein the countdown operation is performed by reducing a random value in time slot units.

12. The STA of claim 7, wherein the trigger frame includes an association identifier (AID) of the STA.

* * * * *